US 7,655,337 B2
United States Patent — Kaye
(45) Date of Patent: Feb. 2, 2010

(54) MICRO FUEL CELL THERMAL MANAGEMENT

(75) Inventor: Ian W. Kaye, Livermore, CA (US)

(73) Assignee: UltraCell Corporation, Livermore, CA (US)

(*) Notice: Subject to any disclaimer, the term of this patent is extended or adjusted under 35 U.S.C. 154(b) by 938 days.

(21) Appl. No.: 10/877,770

(22) Filed: Jun. 25, 2004

(65) Prior Publication Data

US 2005/0008911 A1 Jan. 13, 2005

Related U.S. Application Data

(60) Provisional application No. 60/482,981, filed on Jun. 27, 2003, provisional application No. 60/482,996, filed on Jun. 27, 2003.

(51) Int. Cl.
H01M 2/00 (2006.01)
H01M 8/00 (2006.01)
H01M 2/14 (2006.01)

(52) U.S. Cl. ............... 429/34; 429/12; 429/26; 429/38

(58) Field of Classification Search ............ 429/12–13, 429/17, 19–20, 24, 26, 30, 34–35, 38, 32, 429/39, 72
See application file for complete search history.

(56) References Cited

U.S. PATENT DOCUMENTS

| | | | |
|---|---|---|---|
| 3,468,712 A * | 9/1969 | Gillespie | 429/26 |
| 3,623,913 A * | 11/1971 | Adlhart et al. | 429/20 |
| 5,081,095 A | 1/1992 | Bedford et al. | |
| 5,514,487 A | 5/1996 | Washington et al. | |
| 5,525,436 A | 6/1996 | Savinell et al. | |
| 5,534,328 A | 7/1996 | Ashmead et al. | |
| 5,578,388 A | 11/1996 | Faita et al. | |
| 5,601,938 A | 2/1997 | Mayer et al. | |

(Continued)

FOREIGN PATENT DOCUMENTS

DE 19841993 3/2000

(Continued)

OTHER PUBLICATIONS

Machine Translation and Abstract in English of JP 10162842.*

(Continued)

Primary Examiner—Dah-Wei D Yuan
Assistant Examiner—Claire L Rademaker
(74) Attorney, Agent, or Firm—Beyer Law Group LLP

(57) ABSTRACT

The present invention relates to fuel cells and components used within a fuel cell. Heat transfer appendages are described that improve fuel cell thermal management. Each heat transfer appendage is arranged on an external portion of a bi-polar plate and permits conductive heat transfer between inner portions of the bi-polar plate and outer portions of the bi-polar plate proximate to the appendage. The heat transfer appendage may be used for heating or cooling inner portions of a fuel cell stack. Improved thermal management provided by cooling the heat transfer appendages also permits new channel field designs that distribute the reactant gases to a membrane electrode assembly. Flow buffers are described that improve delivery of reactant gases and removal of reaction products. Single plate bi-polar plates may also include staggered channel designs that reduce the thickness of the single plate.

38 Claims, 13 Drawing Sheets

U.S. PATENT DOCUMENTS

| | | | |
|---|---|---|---|
| 5,611,214 A | 3/1997 | Wegeng et al. | |
| 5,641,585 A | 6/1997 | Lessing et al. | |
| 5,716,727 A | 2/1998 | Savinell et al. | |
| 5,723,228 A * | 3/1998 | Okamoto | 429/12 |
| 5,789,093 A | 8/1998 | Malhi | |
| 5,811,062 A | 9/1998 | Wegeng et al. | |
| 5,961,930 A | 10/1999 | Chatterjee et al. | |
| 5,961,932 A | 10/1999 | Ghosh et al. | |
| 5,998,055 A * | 12/1999 | Kurita et al. | 429/34 |
| 6,077,620 A | 6/2000 | Pettit | |
| 6,080,501 A | 6/2000 | Kelley et al. | |
| 6,193,501 B1 | 2/2001 | Masel et al. | |
| 6,200,536 B1 | 3/2001 | Tonkovich et al. | |
| 6,245,214 B1 | 6/2001 | Rehg et al. | |
| 6,268,077 B1 | 7/2001 | Kelley et al. | |
| 6,309,773 B1 * | 10/2001 | Rock | 429/34 |
| 6,312,846 B1 | 11/2001 | Marsh | |
| 6,322,919 B1 * | 11/2001 | Yang et al. | 429/34 |
| 6,406,808 B1 | 6/2002 | Pratt et al. | |
| 6,415,860 B1 | 7/2002 | Kelly et al. | |
| 6,423,434 B1 | 7/2002 | Pratt et al. | |
| 6,426,161 B1 | 7/2002 | Cisar | |
| 6,460,733 B2 | 10/2002 | Acker et al. | |
| 6,465,119 B1 | 10/2002 | Koripella et al. | |
| 6,470,569 B1 | 10/2002 | Lippert et al. | |
| 6,500,580 B1 | 12/2002 | Marvin et al. | |
| 6,537,506 B1 | 3/2003 | Schwalbe et al. | |
| 6,541,676 B1 | 4/2003 | Franz et al. | |
| 6,569,553 B1 | 5/2003 | Koripella et al. | |
| 6,638,654 B2 | 10/2003 | Jankowksi et al. | |
| 6,673,130 B2 | 1/2004 | Jankowski et al. | |
| 6,686,085 B1 * | 2/2004 | Fujii et al. | 429/39 |
| 6,709,781 B2 | 3/2004 | Suzuki et al. | |
| 6,753,036 B2 | 6/2004 | Jankowski et al. | |
| 6,821,666 B2 | 11/2004 | Morse et al. | |
| 6,852,439 B2 | 2/2005 | Frank et al. | |
| 6,893,708 B2 | 5/2005 | Shen et al. | |
| 7,022,430 B2 * | 4/2006 | Enjoji et al. | 429/39 |
| 7,056,610 B2 * | 6/2006 | Divisek | 429/17 |
| 2001/0029974 A1 | 10/2001 | Cohen et al. | |
| 2002/0012825 A1 | 1/2002 | Sasahara et al. | |
| 2002/0045082 A1 | 4/2002 | Marsh | |
| 2002/0051901 A1 | 5/2002 | Zuber | |
| 2002/0055031 A1 | 5/2002 | Fujii et al. | |
| 2002/0064702 A1 | 5/2002 | Gibb | |
| 2002/0071981 A1 * | 6/2002 | Sano et al. | 429/30 |
| 2002/0076599 A1 | 6/2002 | Neutzler et al. | |
| 2002/0081468 A1 | 6/2002 | Shioya | |
| 2002/0081478 A1 | 6/2002 | Busenbender | |
| 2002/0094462 A1 | 7/2002 | Shioya et al. | |
| 2002/0098119 A1 | 7/2002 | Goodman | |
| 2002/0106540 A1 | 8/2002 | Shioya | |
| 2002/0110718 A1 | 8/2002 | Yang | |
| 2002/0127141 A1 | 9/2002 | Acker | |
| 2002/0131915 A1 | 9/2002 | Shore et al. | |
| 2002/0132156 A1 | 9/2002 | Ruhl et al. | |
| 2002/0147107 A1 | 10/2002 | Abdo et al. | |
| 2002/0150804 A1 | 10/2002 | Srinivasan et al. | |
| 2002/0155333 A1 * | 10/2002 | Fitts et al. | 429/26 |
| 2002/0155335 A1 | 10/2002 | Kearl | |
| 2002/0187379 A1 * | 12/2002 | Yasuo et al. | 429/34 |
| 2002/0192530 A1 * | 12/2002 | Kabumoto et al. | 429/38 |
| 2002/0192537 A1 | 12/2002 | Ren | |
| 2003/0006668 A1 | 1/2003 | Lal et al. | |
| 2003/0022052 A1 | 1/2003 | Kearl | |
| 2003/0027022 A1 | 2/2003 | Arana et al. | |
| 2003/0031910 A1 | 2/2003 | Satou et al. | |
| 2003/0031913 A1 | 2/2003 | Pavio et al. | |
| 2003/0057199 A1 | 3/2003 | Villa et al. | |
| 2003/0072988 A1 | 4/2003 | Frisch | |
| 2003/0082422 A1 | 5/2003 | Koschany | |
| 2003/0082423 A1 * | 5/2003 | Kushibiki et al. | 429/26 |
| 2003/0091502 A1 | 5/2003 | Holladay et al. | |
| 2003/0129464 A1 | 7/2003 | Becerra et al. | |
| 2003/0157387 A1 * | 8/2003 | Hase et al. | 429/32 |
| 2003/0194363 A1 | 10/2003 | Koripella | |
| 2003/0235732 A1 * | 12/2003 | Haltiner, Jr. | 429/24 |
| 2004/0009381 A1 | 1/2004 | Sakai et al. | |
| 2004/0197627 A1 * | 10/2004 | Yan et al. | 429/30 |

FOREIGN PATENT DOCUMENTS

| | | |
|---|---|---|
| GB | 002405744 | 3/2005 |
| JP | 06-310166 A | 11/1994 |
| JP | 10-162842 | 6/1998 |
| JP | 10162842 A * | 6/1998 |
| WO | WO 00/45457 | 8/2000 |
| WO | WO 0161776 A1 * | 8/2001 |
| WO | WO 02/059993 | 8/2002 |
| WO | WO 02/093665 | 11/2002 |
| WO | WO 02/103832 | 12/2002 |
| WO | WO 02/103878 | 12/2002 |
| WO | WO 2004/030805 | 4/2004 |

OTHER PUBLICATIONS

Machine Translation and Abstract in English of JP 10-162842.*
Office Action in U.S. Appl. No. 10/877,824 dated Jun. 22, 2007.
Office Action in U.S. Appl. No. 10/877,824 dated Dec. 18, 2006.
Office Action in U.S. Appl. No. 10/877,824 dated Jun. 14, 2006.
Office Action in U.S. Appl. No. 10/877,824 dated Feb. 28, 2006.
Office Action in U.S. Appl. No. 10/877,824 dated Dec. 8, 2005.
Office Action dated Jan. 16, 2008 in U.S. Appl. No. 10/877,824.
U.S. Appl. No. 10/131,846, entitled: Microfluidic Fuel Cell Systems with Embedded Materials and Structures and Method Thereof, by inventors: Morse, filed Apr. 24, 2002.
U.S. Appl. No. 10/261,353, entitled: Bonded Polyimide Fuel Cell Package and Method Thereof, by inventors: Morse, filed Sep. 30, 2002.
U.S. Appl. No. 10/371,876, entitled: Metal Hydride Fuel Storage and Method Thereof, by inventors: Morse, filed Feb. 21, 2003.
U.S. Appl. No. 10/612,177, entitled: Vapor-deposited Porous Films for Energy Conversion, by inventors: Jankowski, filed Jul. 1, 2003.
U.S. Appl. No. 10/637,914, entitled: Solid Oxide MEMS-based Fuel Cells, by inventors: Jankowski, filed Aug. 8, 2003.
U.S. Appl. No. 10/637,915, entitled: Solid Polymer MEMS-based Fuel Cells, by inventors: Jankowski, filed Aug. 8, 2003.
U.S. Appl. No. 10/783,230, entitled: Method for Fabrication of Electrodes, by inventors: Jankowski, filed Feb. 19, 2004.
U.S. Appl. No. 10/853,859, entitled: Microfluidic Systems with Embedded Materials and Structures and Method Thereof, by inventors: Morse, filed May 25, 2004.
U.S. Appl. No. 10/877,769, entitled "Micro Fuel Cell System Start Up and Shut Down Systems and Methods", by inventors: Kaye, filed Jun. 25, 2004.
U.S. Appl. No. 10/877,824, entitled "Micro Fuel Cell Architecture", by inventors: Kaye, filed Jun. 25, 2004.
U.S. Appl. No. 10/877,771, entitled "Efficient Micro Fuel Cell Systems and Methods", by inventors: Kaye, filed Jun. 25, 2004.
U.S. Appl. No. 10/007,412, entitled "Chemical Microreactor and Method Thereof", by inventors: Morse, filed Dec. 5, 2001.
First Office Action in Patent Application No. 200480024523.4 dated Nov. 23, 2007.
International Search Report dated Jul. 18, 2005 from related International Application No. PCT/US04/20304.
S. Ahmed et al., "Catalytic Partial Oxidation Reforming of Hydrocarbon Fuels", Nov. 16-19, 1998, 1998 Fuel Cell Seminar, Palm Springs, CA.
A.R. Boccaccini et al., "Electrophoretic Deposition of Nanoceramic Particles onto Electrically Conducting Fibre Fabrics", Sep. 21-24, 1998, 43rd International Scientific Colloquium, Technical University of Ilmenau.
J. Bostaph et al., "1 W Direct Methanol Fuel Cell System as a Desktop Charger", Oct. 14, 2002, Motorola Labs, Tempe, AZ.

K. Brooks et al., "Microchannel Fuel Processing, Fuel Cells for Transportation/Fuels for Fuel Cells", May 6-10, 2002, 2002 Annual Program/Lab R&D Review, Pacific Northwest National Laboratory.

M.J. Castaldi et al., "A Compact, Lightweight, Fast-Response Preferential Oxidation Reactor for PEM Automotive Fuel Cell Applications", Sep. 6, 2002, Precision Combustion, Inc., North Haven, CT.

S. Ehrenberg et al., "One Piece Bi-Polar (OPB) Plate with Cold Plate Cooling", Dec. 13, 2002, Session PEM R&D II (2A), Dais Analytic—Rogers.

T.M. Floyd et al., "Liquid-Phase and Multi-Phase Microreactors for Chemical Synthesis", Jun. 1999, Massachusetts Institute of Technology, Cambridge, MA.

A.J. Franz et al., "High Temperature Gas Phase Catalytic and Membrane Reactors", Jun. 1999, Massachusetts Institute of Technology, Cambridge, MA.

J.D. Holladay et al., "Miniature Fuel Processors for Portable Fuel Cell Power Supplies", Nov. 26, 2002, Battelle Pacific Northwest Division, Richland, WA.

S.W. Janson et al., "MEMS, Microengineering and Aerospace Systems", 1999, The American Institute of Aeronautics and Astronautics, Inc.

J. Kaschmitter et al., "Micro-Fabricated Methanol/Water Reformers for Small PEM Fuel Cell Systems", Jul. 21-24, 2003, $8^{th}$ Electrochemical Power Sources R&D Symposium, Portsmouth, VA.

K. Keegan et al., "Analysis for a Planar Solid Oxide Fuel Cell Based Automotive Auxiliary Power Unit", Mar. 4-7, 2002, SAE 2002 World Congress, Detroit, MI.

K. Kempa et al., "Photonic Crystals Based on Periodic Arrays of Aligned Carbon Nanotubes", Oct. 3, 2002, Nano Letters 2003, vol. 3. No. 1, 13-18.

R. Kumar et al., "Solid Oxide Fuel Cell Research at Argonne National Laboratory", Mar. 29-30, 2001, $2^{nd}$ Solid Sate Energy Conversion Alliance Workshop, Arlington, VA.

S.H. Lee et al., "Removal of Carbon Monoxide from Reformate for Polymer Electrolyte Fuel Cell Application", Nov. 16-19, 1998, 1998 Fuel Cell Seminar, Palm Springs, CA.

Q. Li et al., "The CO Poisoning Effect in PEMFCs Operational at Temperatures up to 200° C.", 2003, Journal of The Electrochemical Society, 150 (12) A1599-A1605.

D. Myers et al., "Alternative Water-Gas Shift Catalysts", Jun. 7-8, 2000, 2000 Annual National Laboratory R&D Meeting, DOE Fuel Cells for Transportation Program, Argonne National Laboratory.

D.R. Palo et al., "Development of a Soldier-Portable Fuel Cell Power System, Part I: A Bread-Board Methanol Fuel Processor", 2002, Journal of Power Sources 108 (2002) 28-34.

A. Pattekar et al., "A Microreactor for In-situ Hydrogen Production by Catalytic Methanol Reforming", May 27-30, 2001, Proceedings of the $5^{th}$ International Conference on Microreaction Technology.

A. Pattekar et al., "Novel Microfluidic Interconnectors for High Temperature and Pressure Applications", 2003, Journal of Micromechanics and Microengineering, 13, 337-345.

D. Prater et al., "Systematic Examination of a Direct Methanol-Hydrogen Peroxide Fuel Cell", Sep. 22, 2001, Swift Enterprises, Ltd., Lafayette, IN.

W. Ruettinger et al., "A New Generation of Water Gas Shift Catalysts for Fuel Cell Applications", 2003, Journal of Power Sources, 118, 61-65.

O. Savadogo et al., Hydrogen/Oxygen Polymer Electrolyte Membrane Fuel Cell (PEMFC) Based on Acid-Doped Polybenzimidazole (PBI), 2000, Journal of New Materials for Electrochemical Systems, 3, 345-349.

R.F. Savinell et al., "High Temperature Polymer Electrolyte for PEM Fuel Cells", Sep. 4, 2002, Department of Chemical Engineering, Case Western Reserve University.

R. Srinivasan et al., "Micromachined Reactors for Catalytic Partial Oxidation Reactions", Nov. 1997, AIChe Journal, vol. 43, No. 11, 3059-3069.

S. Swartz et al., "Ceria-Based Water-Gas-Shift Catalysts", Aug. 1, 2003, NexTech Materials, Ltd., Wolrthington, OH.

S. Tasic et al., "Multilayer Ceramic Processing of Microreactor Systems", Oct. 14, 2002, Motorola Labs, Tempe, AZ.

V. Tomašić et al., "Development of the Structured Catalysts for the Exhaust Gas Treatment", 2001, Chem. Biochem. Eng. Q. 15 (3), 109-115.

Tiax LLC, "Advanced Hydrogen Storage: A System's Perspective and Some Thoughts on Fundamentals", Aug. 14-15, 2002, Presentation for DOE Workshop on Hydrogen Storage, Cambridge, MA.

Wan et al., "Catalyst Preparation: Catalytic Converter", Feb. 19, 2003, www.insightcentral.net/encatalytic.html.

J. Zizelman et al., "Solid-Oxide Fuel Cell Auxiliary Power Unit: A Paradigm Shift in Electric Supply for Transportation", undated, Delphi Automotive Systems.

"Methanol-Powered Laptops—Cleared for Take-Off", www.silicon.com, Oct. 7, 2002.

Melissa Funk, "Methanol Fuel Quality Specification Study for Proton Exchange Membrane Fuel Cells, Final Report", XCELLSIS, Feb. 2002, 65 pages.

Dr. Detlef zur Megede et al., "MFCA Research Document, Complete", Methanol Fuel Cell Alliance, Sep. 2000, 242 pages.

Office Action dated Jun. 20, 2008 from Chinese Patent Application No. 200480024523.4.

Final Office Action dated Aug. 5, 2008 from U.S. Appl. No. 11/830,268.

Office Action dated Aug. 12, 2008 from U.S. Appl. No. 10/877,824.

Notice of Allowance dated Jun. 25, 2009 in U.S. Appl. No. 11/830,268.

Office Action dated Feb. 4, 2009 in U.S. Appl. No. 11/830,268.

Office Action dated Mar. 9, 2009 in U.S. Appl. No. 10/877,824.

Office Action dated Nov. 22, 2008 in Chinese Patent Application No. 200480024523.4.

Office Action dated Aug. 17, 2009 from U.S. Appl. No. 10/877,824.

* cited by examiner

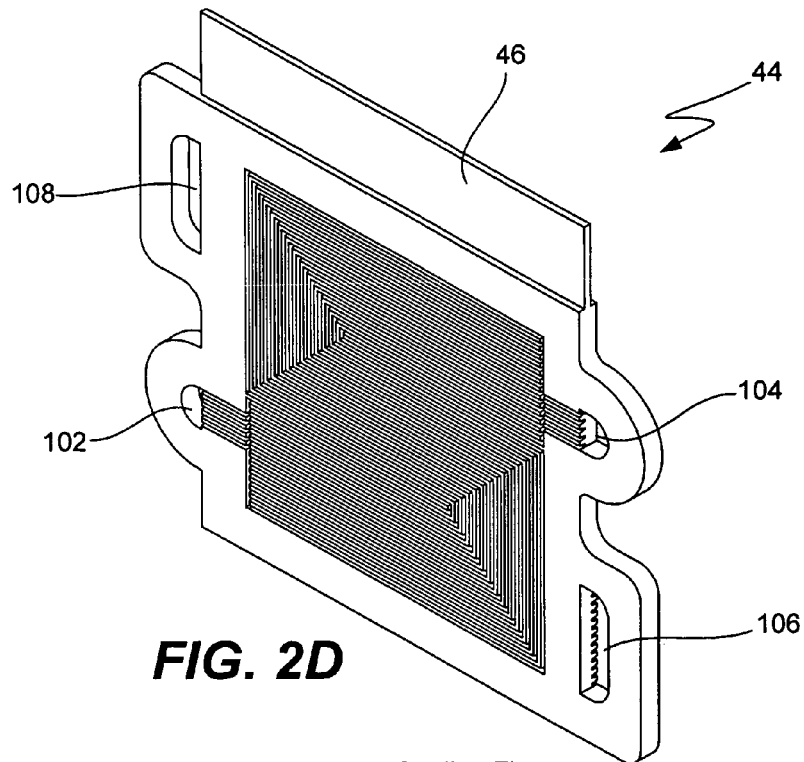
FIG. 2D
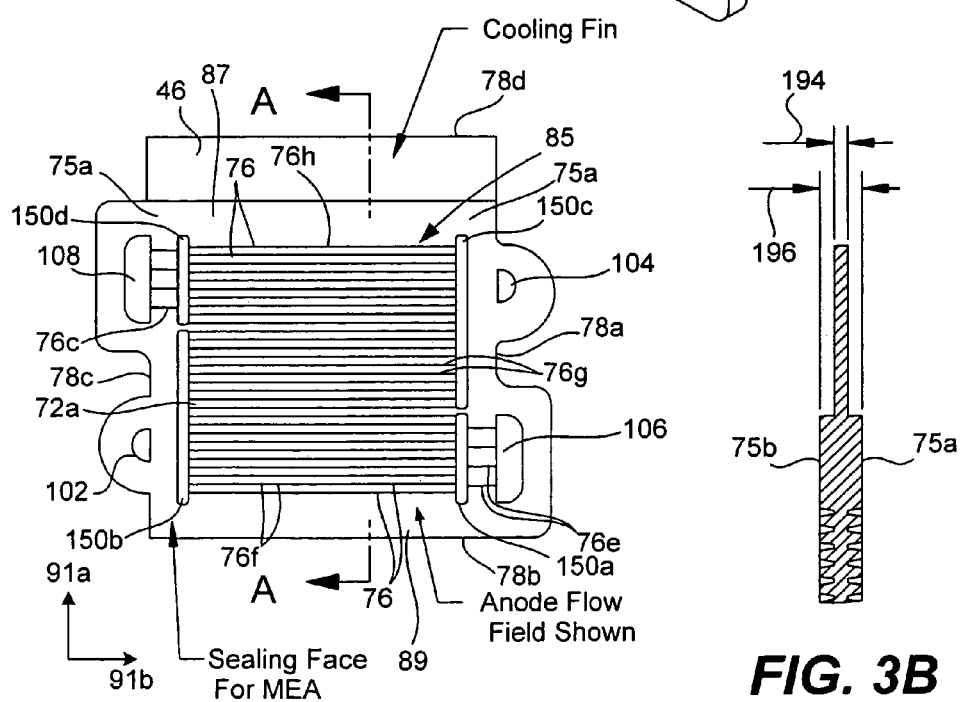
FIG. 2E
FIG. 3B

MICRO FUEL CELL THERMAL MANAGEMENT

CROSS-REFERENCE TO RELATED APPLICATIONS

This application claims priority under 35 U.S.C. §119(e) from co-pending U.S. Provisional Patent Application No. 60/482,981 entitled "Micro machined fuel stack with integral cooling and humidification", which is incorporated by reference for all purposes; and also claims priority under 35 U.S.C. §119(e) from co-pending U.S. Provisional Patent Application No. 60/482,996 entitled "Fuel cell system startup procedure and self-heating apparatus", both filed Jun. 27, 2003 which is incorporated by reference for all purposes.

BACKGROUND OF THE INVENTION

The present invention relates to fuel cell technology. In particular, the invention relates to improved thermal management techniques for use in fuel cells.

A fuel cell electrochemically combines hydrogen and oxygen to produce electricity. Fuel cell evolution so far has concentrated on large-scale applications such as industrial size generators for electrical power back-up.

Consumer electronics devices and other portable electrical power applications currently rely on lithium ion and similar battery technologies. Demand for alternatives to these conventional battery technologies increases. The fuel cell industry is racing to produce a fuel cell small enough to power a portable consumer electronics device, such as a laptop computer.

Byproducts of the energy-generating electrochemical reaction in a fuel cell include water vapor and carbon dioxide. The electro-chemical reaction also generates heat. In a stack plate fuel cell where numerous plates are stacked together and sandwich multiple electro-chemical layers, heat dissipation from internal portions of the stack remains a challenge. Current heat management techniques rely on thermal cooling layers disposed adjacent to each electro-chemical layer and between each set of plates. For a fuel cell having a stack of twenty plates and nineteen electro-chemistry layers, conventional heat removal techniques thus demand nineteen cooling layers. These intermittent heat dissipation layers significantly increase the fuel cell package thickness, volume, and size.

In view of the foregoing, alternative techniques to manage heat within a fuel cell would be desirable. In addition, techniques that reduce package size would be highly beneficial.

SUMMARY OF THE INVENTION

The present invention relates to fuel cells that generate electrical energy and components used within a fuel cell. One aspect of the invention improves fuel cell thermal management. In this case, a bi-polar plate included the fuel cell stack comprises one or more heat transfer appendages. Arranging an appendage on an external portion of the bi-polar plate permits conductive thermal communication between inner portions of the plate and the external appendage. The appendage thus enables external thermal regulation of internal portions of a fuel cell stack. The heat transfer appendage may be integrally formed with the bi-polar plate material to facilitate conductive thermal communication between inner portions of the bi-polar plate and heat transfer appendage.

A heat transfer appendage may be used for heating or cooling. For cooling exothermic and central portions of the fuel cell stack during hydrogen consumption and energy production, the fuel cell assembly employs a cooling medium that passes over the heat transfer appendage. This allows internally generated heat within a fuel cell stack to move from a) a heat generating membrane electrode assembly to central portions of a bi-polar plate in contact with the membrane electrode assembly, b) from the central portion of the bi-polar plate through the bi-polar plate substrate to a heat transfer appendage, and c) from the heat transfer appendage to the cooling medium for heat exhaust from the fuel cell.

For heating central portions of the fuel cell stack during initial fuel cell warm-up, an exothermic catalyst is disposed in contact or in the vicinity of the heat transfer appendage. A heating medium passes over the catalyst to react with the catalyst and generate heat, which is absorbed by the heat transfer appendage. The heat conducts through the bi-polar plate to internal portions of the fuel cell stack, e.g., to a membrane electrode assembly. In this manner, a thermal catalyst and heat transfer appendage reduces the warm-up time needed to start generating electricity in the fuel cell.

Heat transfer appendages described herein negate the need for conventional heat removal layers disposed between plates of a bi-polar plate. Eliminating the conventional heat removal layers reduces the thickness of a fuel cell stack, and decreases the fuel cell size and volume.

In addition, eliminating the conventional heat removal layers used between two plates of a bi-polar plate enables a bi-polar plate having channel fields disposed on opposing faces of a single plate. Changing a bi-polar plate from the conventional two plates to a single plate significantly reduces the thickness of a fuel cell stack. Correspondingly, the fuel cell size and volume also decrease.

Single plate bi-polar plates may also include staggered channel designs that reduce the thickness of the single plate. The staggered channel designs permit a bi-polar plate to have a thickness between opposite faces that is less than 2x, where x is the approximate depth of a channel used in a channel field. This further reduces the fuel cell package thickness and size.

Improved thermal management provided by cooling the heat transfer appendages also permits new channel field and gaseous flow designs that distribute the reactant gases to a membrane electrode assembly. For example, parallel, cross flow, co-flow, and counter flow channel field designs are provided herein.

Gas distribution channel fields used in a bi-polar plate may also include one or more flow buffers that improve delivery of reactant gases and removal of reaction products. The flow buffers provide common storage areas for flow of gases between individual channels. If a particular channel becomes blocked or otherwise witnesses a pressure disturbance or fluctuation, the buffer reduces pressure variance in the flow field and avoids downstream effects caused by the disturbance. By reducing pressure variance of gases provided to the membrane electrode assembly, the flow buffers improve fuel cell performance.

Another innovation described herein for use in a fuel cell relates to pre-bent end plates that more uniformly apply pressure onto a fuel cell stack.

In one aspect, the present invention relates to a bi-polar plate for use in a fuel cell. The bi-polar plate comprises a substrate having a first channel field disposed on a first face of the substrate and a second channel field disposed on a second face of the substrate. The first channel field includes a set of channels configured to distribute a gas used in the fuel cell. The second channel field includes a second set of channels configured to distribute a gas used in the fuel cell. The bi-polar plate also comprises a heat transfer appendage in conductive thermal communication with the substrate and arranged outside the first channel field.

In another aspect, the present invention relates to a fuel cell for producing electrical energy. The fuel cell comprises a fuel cell stack. The fuel cell stack includes a set of bi-polar plates. Each bi-polar plate comprises i) a first channel field disposed on a first face of the bi-polar plate and including a set of channels configured to distribute hydrogen, ii) a second channel field disposed on a second face of the bi-polar plate and including a second set of channels configured to distribute oxygen, and iii) a heat transfer appendage arranged outside the first channel field and in conductive thermal communication with substrate included in the bi-polar plate. The fuel cell stack also includes a membrane electrode assembly disposed between two bi-polar plates. The membrane electrode assembly includes a hydrogen catalyst, an oxygen catalyst and an ion conductive membrane that electrically isolates the hydrogen catalyst from the oxygen catalyst.

In yet another aspect, the present invention relates to a fuel cell for producing electrical energy. The fuel cell comprises a fuel cell stack. The fuel cell stack includes a set of bi-polar plates. Each bi-polar plate comprises i) a substrate having a first channel field disposed on a first face of the substrate and a second channel field disposed on a second face of the substrate. The first channel field includes a set of channels configured to distribute oxygen and the second channel field includes a second set of channels configured to distribute hydrogen. Each bi-polar plate also comprises ii) a heat transfer appendage in conductive thermal communication with the substrate and arranged outside the first channel field. The fuel cell stack also includes a membrane electrode assembly disposed between two bi-polar plates, the membrane electrode assembly including a hydrogen catalyst, an oxygen catalyst and an ion conductive membrane that electrically isolates the hydrogen catalyst from the oxygen catalyst.

In still another aspect, the present invention relates to a fuel cell for producing electrical energy. The fuel cell comprises a fuel cell stack. The fuel cell stack includes a set of bi-polar plates. Each bi-polar plate comprises a substrate having a first channel field disposed on a first face of the substrate and a second channel field disposed on a second face of the substrate. The first channel field includes a set of channels configured to distribute oxygen. The second channel field includes a second set of channels configured to distribute hydrogen. Each bi-polar plate also comprises a heat transfer appendage in conductive thermal communication with the substrate and arranged outside the first channel field. The fuel cell also comprises a thermal catalyst disposed in contact with or in proximity to the heat transfer appendage. The thermal catalyst generates heat with exposure to a heating medium. The fuel cell further comprises a membrane electrode assembly disposed between two bi-polar plates. The membrane electrode assembly includes a hydrogen catalyst, an oxygen catalyst and an ion conductive membrane that electrically isolates the hydrogen catalyst from the oxygen catalyst.

In another aspect, the present invention relates to a bi-polar plate for use in a fuel cell. The bi-polar plate comprises a first channel field disposed on a first face of the bi-polar plate and including a set of channels. The bi-polar plate also comprises a second channel field disposed on a second face of the bi-polar plate and including a second set of channels. The bi-polar plate further comprises a flow buffer configured to receive a gas from a first channel in the first set of channels and output the gas to a second channel in the first set of channels.

In yet another aspect, the present invention relates to a fuel cell for producing electrical energy. The fuel cell comprises a fuel cell stack. The fuel cell stack includes a set of bi-polar plates. Each bi-polar plate comprises a first channel field disposed on a first face of the bi-polar plate. The first channel field includes a set of channels. Each bi-polar plate also comprises a second channel field disposed on a second face of the bi-polar plate. The second channel field includes a second set of channels. Each bi-polar plate also comprises a flow buffer disposed on the first face and configured to reduce pressure variance of gaseous flow in the first channel field. The fuel cell stack also includes a membrane electrode assembly disposed between two bi-polar plates. The membrane electrode assembly includes a hydrogen catalyst, an oxygen catalyst and an ion conductive membrane that electrically isolates the hydrogen catalyst from the oxygen catalyst.

In still another aspect, the present invention relates to a bi-polar plate for use in a fuel cell. The bi-polar plate comprises a substrate having a first face and a second face. The bi-polar plate also comprises a first channel field disposed on the first face. The bi-polar plate further comprises a second channel field disposed on the second face. A channel included in the first channel field has an overlapping channel depth that extends past a channel depth for a channel included in the second channel field.

In another aspect, the present invention relates to a fuel cell for producing electrical energy. The fuel cell comprises a first bi-polar plate including a first channel field disposed on a first face of the plate. The fuel cell also comprises a membrane electrode assembly including a hydrogen catalyst, an oxygen catalyst and an ion conductive membrane that electrically isolates the hydrogen catalyst from the oxygen catalyst. The fuel cell further comprises a second bi-polar plate including a second channel field disposed on a face of the second bi-polar plate that opposes the first face of the first bi-polar plate when the first bi-polar plate and second bi-polar plate are assembled on opposite sides of the membrane electrode assembly. The fuel cell additionally comprises a first landing on the first bi-polar plate that includes a surface area of the first bi-polar plate disposed between two channels in the first channel field. The fuel cell also comprises a second landing on the second bi-polar plate that includes a surface area of the second bi-polar plate disposed between two channels in the second channel field. The first landing at least partially overlaps the second landing when the first bi-polar plate and second bi-polar plate are assembled on opposite sides of the membrane electrode assembly.

In yet another aspect, the present invention relates to a fuel cell for producing electrical energy. The fuel cell comprises a set of bi-polar plates. Each bi-polar plate comprises a first channel field disposed on a first face of the bi-polar plate and a second channel field disposed on a second face of the bi-polar plate. The first channel field includes a first set of channels and the second channel field includes a second set of channels. The fuel cell also comprises a membrane electrode assembly disposed between two bi-polar plates. The membrane electrode assembly includes a hydrogen catalyst, an oxygen catalyst and an ion conductive membrane that electrically isolates the hydrogen catalyst from the oxygen catalyst. The fuel cell further comprises a top end plate. The fuel cell additionally comprises a bottom end plate that secures to the top end plate and applies pressure to the membrane electrode assembly when the top and bottom end plates are secured together. One of the top and bottom end plates is configured with a shape before assembly in the fuel cell that increases pressure applied to a central planar portion of the membrane electrode assembly when the top end plate and bottom end plate are secured together.

In still another aspect, the present invention relates to a bi-polar plate for use in a fuel cell. The bi-polar plate comprises a substrate having a first face and a second face. The bi-polar plate also comprises a first channel field disposed on the first face. The bi-polar plate further comprises a second channel field disposed on the second face. The bi-polar plate additionally comprises a manifold configured to deliver a gas to the first channel field or receive a gas from the first channel field. The bi-polar plate also comprises a manifold channel that opens to the manifold on the second face, traverses the substrate from the first face to the second face, and is configured to communicate gas between the manifold and the first channel field.

In yet another aspect, the present invention relates to a fuel cell for producing electrical energy. The fuel cell comprises a first bi-polar plate, which includes: i) a manifold configured to deliver a gas to a first channel field on a first face of the plate or receive a gas from the first channel field, and ii) a first gasket landing on the first face that peripherally surrounds the manifold on the first face. The fuel cell also comprises a second bi-polar plate, which includes: i) a manifold that substantially aligns with the manifold of the first plate, and ii) a second gasket landing on a face of the second bi-polar plate that peripherally surrounds the second plate manifold. The second bi-polar plate face faces the first face of the first bi-polar plate when the first plate and second plate are disposed adjacent to each other. The fuel cell further comprises a membrane electrode assembly disposed between the first and second bi-polar plates, the membrane electrode assembly including a hydrogen catalyst, an oxygen catalyst and an ion conductive membrane that electrically isolates the hydrogen catalyst from the oxygen catalyst.

In another aspect, the present invention relates to a fuel cell for producing electrical energy. The fuel cell comprises a fuel cell stack. The fuel cell stack includes a set of bi-polar plates. Each bi-polar plate in the fuel cell stack comprises i) a first channel field disposed on a first face of the bi-polar plate and including a set of channels configured to distribute fuel, ii) a second channel field disposed on a second face of the bi-polar plate and including a second set of channels configured to distribute an oxidant, and iii) a heat transfer appendage arranged outside the first channel field and in conductive thermal communication with substrate included in the bi-polar plate. The fuel cell stack includes a membrane electrode assembly disposed between two bi-polar plates, the membrane electrode assembly including an anode catalyst, a cathode catalyst and an ion conductive membrane that electrically isolates the anode catalyst from the cathode catalyst.

These and other features and advantages of the present invention will be described in the following description of the invention and associated figures.

BRIEF DESCRIPTION OF THE DRAWINGS

FIG. 2D illustrates top perspective view of a bi-polar plate in accordance with one embodiment of the present invention.

FIG. 2E illustrates a top elevated view of the bi-polar plate of FIG. 2D.

FIG. 3B illustrates a cross section of a heat transfer appendage and bi-polar plate in accordance with one embodiment of the present invention.

DETAILED DESCRIPTION OF THE PREFERRED EMBODIMENTS

The present invention is described in detail with reference to a few preferred embodiments as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

1. Fuel Cell System

Figure 1A:
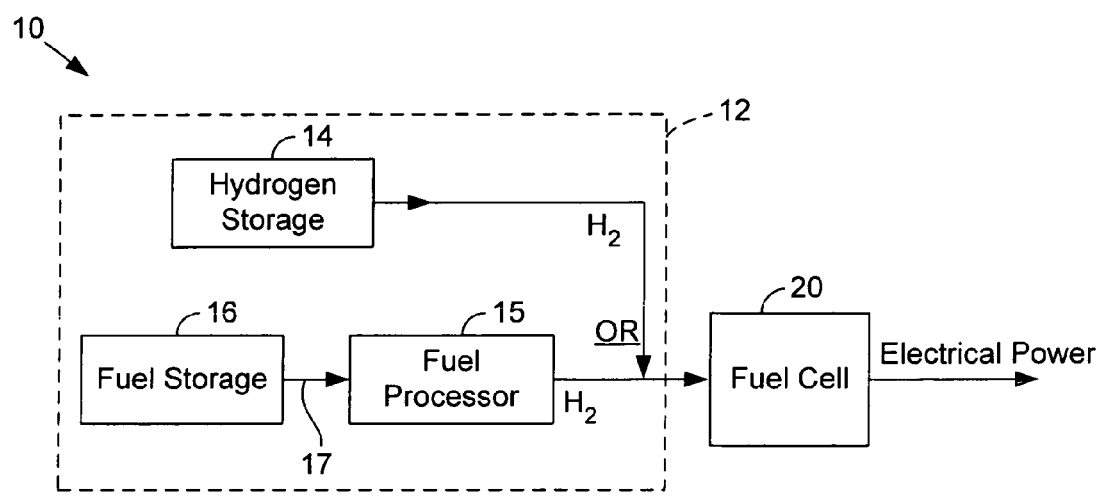
FIG. 1A illustrates a fuel cell system for producing electrical energy in accordance with one embodiment of the present invention.

FIG. 1A illustrates a fuel cell system 10 for producing electrical energy in accordance with one embodiment of the present invention. Fuel cell system 10 comprises a hydrogen fuel supply 12 and a fuel cell 20.

Hydrogen supply 12 provides hydrogen to fuel cell 20. As shown, supply 12 includes a hydrogen storage device 14 and/or a 'reformed' hydrogen supply. Fuel cell 20 typically receives hydrogen from one supply at a time, although fuel cell systems 10 that employ redundant hydrogen provision from multiple supplies are useful in some applications. Hydrogen storage device 14 outputs hydrogen, which may be a pure source such as compressed hydrogen held in a pressurized container 14. A solid-hydrogen storage system such as a metal-based hydrogen storage device known to those of skill in the art may also be used for hydrogen storage device 14.

A 'reformed' hydrogen supply processes a fuel source to produce hydrogen. Fuel source 17 acts as a carrier for hydrogen and can be processed to separate hydrogen. Fuel source 17 may include any hydrogen bearing fuel stream, hydrocarbon fuel or other hydrogen fuel source such as ammonia. Currently available hydrocarbon fuel sources 17 suitable for use with the present invention include methanol, ethanol, gasoline, propane, butane and natural gas, for example. Several hydrocarbon and ammonia products may also produce a suitable fuel source 17. Liquid fuel sources 17 offer high energy densities and the ability to be readily stored and shipped. Storage device 16 may contain a fuel mixture. When the fuel processor 15 comprises a steam reformer, storage device 16 may contain a fuel mixture of a hydrocarbon fuel source and water. Hydrocarbon fuel source/water fuel mixtures are frequently represented as a percentage fuel source in water. In one embodiment, fuel source 17 comprises methanol or ethanol concentrations in water in the range of 1%-99.9%. Other liquid fuels such as butane, propane, gasoline, military grade "JP8" etc. may also be contained in storage device 16 with concentrations in water from 5-100%. In a specific embodiment, fuel source 17 comprises 67% methanol by volume.

As shown, the reformed hydrogen supply comprises a fuel processor 15 and a fuel source storage device 16. Storage device 16 stores fuel source 17 and may include a portable and/or disposable fuel cartridge. A disposable cartridge offers instant recharging to a consumer. In one embodiment, the cartridge includes a collapsible bladder design within a hard plastic dispenser case. A separate fuel pump typically controls fuel source 17 flow from storage device 16. If system 10 is load following, then fuel source 17 is metered by a control system to deliver fuel source 17 to processor 15 at a flow level necessary for the required power level output of fuel cell 20. Further description of a fuel storage device suitable for use with the present invention is included in commonly owned co-pending patent application entitled "Portable Fuel Cartridge for Fuel Cells" naming Ian Kaye as inventor and filed on the same day as this patent application, which is incorporated by reference for all purposes.

Fuel processor 15 processes the hydrocarbon fuel source 17 and outputs hydrogen. Conventional hydrocarbon fuel processors 15 heat and process a fuel source 17 in the presence of a catalyst to produce the hydrogen. Fuel processor 15 comprises a reformer, which is a catalytic device that converts a liquid or gaseous hydrocarbon fuel source 17 into hydrogen and carbon dioxide. Several types of reformers suitable for use in fuel cell system 10 include steam reformers, auto thermal reformers (ATR) or catalytic partial oxidizers (CPOX). Steam reformers only need steam to produce hydrogen, whereas ATR and CPOX reformers mix air with the fuel and steam mix. ATR and CPOX systems reform fuels such as methanol, diesel, regular unleaded gasoline and other hydrocarbons. In a specific embodiment, storage device 16 provides methanol 17 to fuel processor 15, which reforms the methanol at about 250° C. or less and allows fuel cell system 10 use in applications where temperature is to be minimized. Further description of a fuel processor suitable for use with the present invention is included in commonly owned co-pending patent application entitled "Annular Fuel Processor and Methods" naming Ian Kaye as inventor and filed on the same day as this patent application, which is incorporated by reference for all purposes.

Fuel cell 20 electrochemically converts hydrogen and oxygen to water, generating electricity and heat in the process. Ambient air commonly supplies oxygen for fuel cell 20. A pure or direct oxygen source may also be used for oxygen supply. The water often forms as a vapor, depending on the temperature of fuel cell 20 components. The electrochemical reaction also produces carbon dioxide as a byproduct for many fuel cells.

In one embodiment, fuel cell 20 is a low volume polymer electrolyte membrane (PEM) fuel cell suitable for use with portable applications such as consumer electronics. A polymer electrolyte membrane fuel cell comprises a membrane electrode assembly 40 that carries out the electrical energy generating electrochemical reaction. The membrane electrode assembly includes a hydrogen catalyst, an oxygen catalyst and an ion conductive membrane that a) selectively conducts protons and b) electrically isolates the hydrogen catalyst from the oxygen catalyst. A hydrogen gas distribution layer contains the hydrogen catalyst and allows the diffusion of hydrogen therethrough. An oxygen gas distribution layer contains the oxygen catalyst and allows the diffusion of oxygen and hydrogen protons therethrough. The ion conductive membrane separates the hydrogen and oxygen gas distribution layers. In chemical terms, the anode comprises the hydrogen gas distribution layer and hydrogen catalyst, while the cathode comprises the oxygen gas distribution layer and oxygen catalyst.

In one embodiment, the membrane electrode assembly is disposed between two plates. Hydrogen distribution 43 occurs via a channel field on one plate while oxygen distribution 45 occurs via a channel field on a second facing plate. Specifically, a first channel field distributes hydrogen to the hydrogen gas distribution layer, while a second channel field distributes oxygen to the oxygen gas distribution layer. A PEM fuel cell often includes a fuel cell stack having a set of bi-polar plates. The term 'bi-polar' plate refers to a structure incorporating reactant gas flow channels on two faces (whether composed of one plate or two plates) that is sandwiched between two membrane electrode assembly layers. In this case, the bi-polar plate acts as both a negative terminal for one adjacent membrane electrode assembly and a positive terminal for the other adjacent membrane electrode assembly.

In electrical terms, the anode includes the hydrogen gas distribution layer, hydrogen catalyst and bi-polar plate. The anode acts as the negative electrode for fuel cell 20 and conducts electrons that are freed from hydrogen molecules so that they can be used externally, e.g., to power an external circuit. In a fuel cell stack, the bi-polar plates are connected in series to add the potential gained in each layer of the stack. In electrical terms, the cathode includes the oxygen gas distribution layer, oxygen catalyst and bi-polar plate. The cathode represents the positive electrode for fuel cell 20 and conducts the electrons back from the external electrical circuit to the oxygen catalyst, where they can recombine with hydrogen ions and oxygen to form water.

The hydrogen catalyst breaks the hydrogen into protons and electrons. The ion conductive membrane blocks the electrons, and electrically isolates the chemical anode (hydrogen gas distribution layer and hydrogen catalyst) from the chemical cathode (see FIG. 2C). The ion conductive membrane also selectively conducts positively charged ions. Electrically, the anode conducts electrons to a load (electricity is produced) or battery (energy is stored). Meanwhile, protons move through the ion conductive membrane, to combine with oxygen. The protons and used electrons subsequently meet on the cathode side, and combine with oxygen to from water. The oxygen catalyst in the oxygen gas distribution layer facilitates this reaction. One common oxygen catalyst comprises platinum powder very thinly coated onto a carbon paper or cloth. Many designs employ a rough and porous catalyst to increase surface area of the platinum exposed to the hydrogen and oxygen.

In one embodiment, fuel cell 20 comprises a set of bi-polar plates that each includes channel fields on opposite faces that distribute the hydrogen and oxygen. One channel field distributes hydrogen while a channel field on the opposite face distributes oxygen. Multiple bi-polar plates can be stacked to produce a 'fuel cell stack' (FIG. 2A) in which a membrane electrode assembly is disposed between each pair of adjacent bi-polar plates.

Since the electrical generation process in fuel cell 20 is exothermic, fuel cell 20 implements a thermal management system to dissipate heat from the fuel cell. Fuel cell 20 may also employ a number of humidification plates (HP) to manage moisture levels in the fuel cell.

While the present invention will mainly be discussed with respect to PEM fuel cells, it is understood that the present invention may be practiced with other fuel cell architectures. The main difference between fuel cell architectures is the type of ion conductive membrane used. In one embodiment, fuel cell 20 is phosphoric acid fuel cell that employs liquid phosphoric acid for ion exchange. Solid oxide fuel cells employ a hard, non-porous ceramic compound for ion exchange and may be suitable for use with the present invention. Generally, any fuel cell architecture may benefit from one or more bi-polar plate and thermal management improvements described herein. Other such fuel cell architectures include direct methanol, alkaline and molten carbonate fuel cells.

Fuel cell 20 generates dc voltage that may be used in a wide variety of applications. For example, electricity generated by fuel cell 20 may be used to power a motor or light. In one embodiment, the present invention provides 'small' fuel cells that are designed to output less than 200 watts of power. Fuel cells of this size are commonly referred to as 'micro fuel cells' and are well suited for use with portable electronics. In one embodiment, fuel cell 20 is configured to generate from about 1 milliwatt to about 200 watts. In another embodiment, fuel cell 20 generates from about 3 W to about 20 W. Fuel cell 20 may also be a stand-alone fuel cell, which is a single unit that produces power as long as it has an a) oxygen and b) hydrogen or a hydrocarbon fuel supply. A fuel cell 20 that outputs from about 40 W to about 100 W is well suited to power a laptop computer. Power levels greater than 80 kW can be achieved by significantly increasing the number of cells to 100-300 cells and increasing the plate area.

Figure 1B:
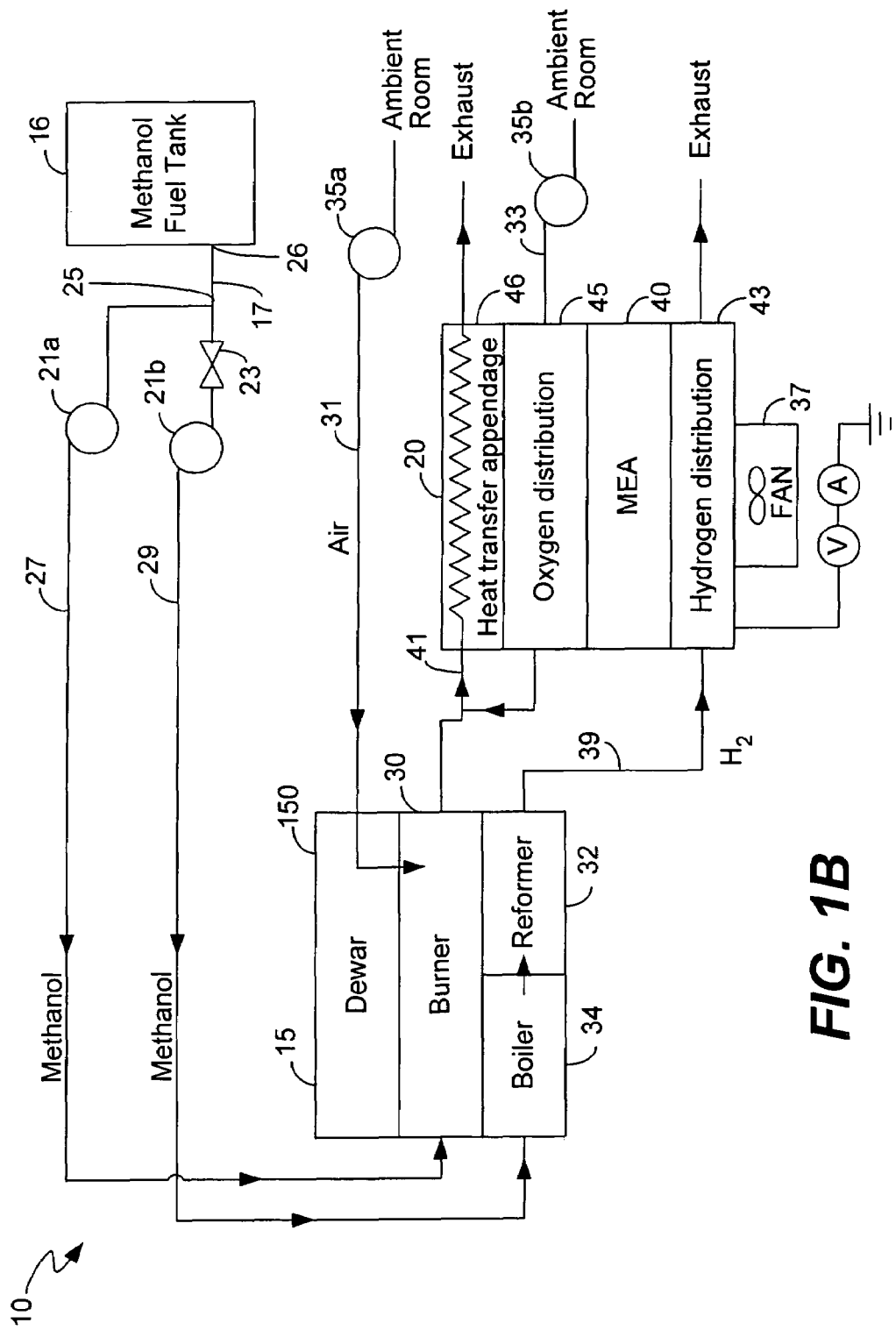
FIG. 1B illustrates schematic operation for the fuel cell system of FIG. 1A in accordance with a specific embodiment of the present invention.

FIG. 1B schematically illustrates the operation of fuel cell system 10 in accordance with a specific embodiment of the present invention. As shown, fuel cell system 10 comprises fuel container 16, hydrogen fuel source 17, fuel processor 15, fuel cell 20, multiple pumps 21 and fans 35, fuel lines and gas lines, and one or more valves 23.

Fuel container 16 stores methanol as a hydrogen fuel source 17. An outlet 26 of fuel container 16 provides methanol 17 into hydrogen fuel source line 25. As shown, line 25 divides into two lines: a first line 27 that transports methanol 17 to a burner 30 for fuel processor 15 and a second line 29 that transports methanol 17 to reformer 32 in fuel processor 15. Lines 25, 27 and 29 may comprise plastic tubing, for example. Separate pumps 21a and 21b are provided for lines 27 and 29, respectively, to pressurize the lines and transmit the fuel source at independent rates if desired. A model P625 pump as provided by Instech of Plymouth Meeting, Pa. is suitable to transmit liquid methanol for system 10 is suitable in this embodiment. A flow sensor or valve 23 situated on line 29 between storage device 16 and fuel processor 18 detects and communicates the amount of methanol 17 transfer between storage device 16 and reformer 32. In conjunction with the sensor or valve 23 and suitable control, such as digital control applied by a processor that implements instructions from stored software, pump 21b regulates methanol 17 provision from storage device 16 to reformer 32.

Fan 35a delivers oxygen and air from the ambient room through line 31 to regenerator 36 of fuel processor 15. Fan 35b delivers oxygen and air from the ambient room through line 33 to regenerator 36 of fuel processor 15. In this embodiment, a model AD2005DX-K70 fan as provided by Adda USA of California is suitable to transmit oxygen and air for fuel cell system 10. A fan 37 blows cooling air over fuel cell 20 and its heat transfer appendages 46. Cooling of fuel cell 20 via heat transfer appendages 46 will be described below in more detail with respect to FIGS. 2D, 2E and 3A.

Fuel processor 15 receives methanol 17 from storage device 16 and outputs hydrogen. Fuel processor 15 comprises burner 30, reformer 32, boiler 34 and regenerator 36. Burner 30 includes an inlet that receives methanol 17 from line 27 and a catalyst that generates heat with methanol presence. In one embodiment, burner 30 includes an outlet that exhausts heated gases to a line 41, which transmits the heated gases to fuel cell 20 for passage over heat transfer appendages 46 to pre-heat the fuel cell and expedite warm-up time needed when initially turning on fuel cell 20. An outlet of burner 30 may also exhaust heated gases into the ambient room.

Boiler 34 includes an inlet that receives methanol 17 from line 29. The structure of boiler 34 permits heat produced in burner 30 to heat methanol 17 in boiler 34 before reformer 32 receives the methanol 17. Boiler 34 includes an outlet that provides heated methanol 17 to reformer 32.

Reformer 32 includes an inlet that receives heated methanol 17 from boiler 34. A catalyst in reformer 32 reacts with the methanol 17 and produces hydrogen and carbon dioxide. This reaction is slightly endothermic and draws heat from burner 30. A hydrogen outlet of reformer 32 outputs hydrogen to line 39. In one embodiment, fuel processor 15 also includes a preferential oxidizer that intercepts reformer 32 exhaust and decreases the amount of carbon monoxide in the exhaust. The preferential oxidizer employs oxygen from an air inlet to the preferential oxidizer and a catalyst, such as ruthenium or platinum, which is preferential to carbon monoxide over carbon dioxide.

In one embodiment, fuel processor 15 includes a dewar 150 that pre-heats air before the air enters burner 30. Dewar 150 also reduces heat loss from fuel cell 15 by heating the incoming air before it escapes fuel processor 15. In one sense, dewar 150 acts as a regenerator that uses waste heat in fuel processor 15 to increase thermal management and thermal efficiency of the fuel processor. Specifically, waste heat from burner 30 may be used to pre-heat incoming air provided to burner 30 to reduce heat transfer to the air in the burner so more heat transfers to reformer 32.

Line 39 transports hydrogen from fuel processor 15 to fuel cell 20. Gaseous delivery lines 31, 33 and 39 may comprise plastic tubing, for example. A hydrogen flow sensor (not shown) may also be added on line 39 to detect and communicate the amount of hydrogen being delivered to fuel cell 20. In conjunction with the hydrogen input sensor and suitable control, such as digital control applied by a processor that implements instructions from stored software, fuel processor 15 regulates hydrogen gas provision to fuel cell 20.

Fuel cell 20 includes an hydrogen inlet port 84 (FIG. 2B) that receives hydrogen from line 39 and delivers it to a hydrogen intake manifold (FIG. 2E) for delivery to one or more bi-polar plates and their hydrogen distribution channels. An oxygen inlet port 88 (FIG. 2B) receives oxygen from line 33 and delivers it to an oxygen intake manifold (FIG. 2E) for delivery to one or more bi-polar plates and their oxygen distribution channels. An anode exhaust manifold collects gases from the hydrogen distribution channels and delivers them to an anode exhaust port, which outlets the exhaust gases into the ambient room. A cathode exhaust manifold collects gases from the oxygen distribution channels and delivers them to a cathode exhaust port. In one embodiment, the cathode exhaust gases are routed to line 41, which transmits the heated gases over heat transfer appendages 46 of fuel cell 20 to pre-heat the fuel cell and expedite warm-up time needed when initially turning on fuel cell 20.

The schematic operation for fuel cell system 10 shown in FIG. 1B is exemplary and other variations on fuel cell system design, such as reactant and byproduct plumbing, are contemplated. In one embodiment, the present invention routes anode exhaust from fuel cell 20 back to burner 30. Since hydrogen consumption within fuel cell 20 is often incomplete and exhaust from the hydrogen distribution channels includes unused hydrogen, re-routing the exhaust to burner 30 allows fuel cell system 10 to capitalize on the unused portions and increase hydrogen usage and efficiency in system 10. Further description of this embodiment and additional schematic examples of fuel cell system 10 are described in commonly owned co-pending patent application entitled "Annular Fuel Processor and Methods", which was incorporated by reference above. In addition to the components shown in shown in FIG. 1B, system 10 may also include other elements such as electronic controls, additional pumps and valves, added system sensors, manifolds, heat exchangers and electrical interconnects useful for carrying out functionality of system 10 which are known to one of skill in the art and omitted herein for sake of brevity.

2. Fuel Cell

Figure 2A:
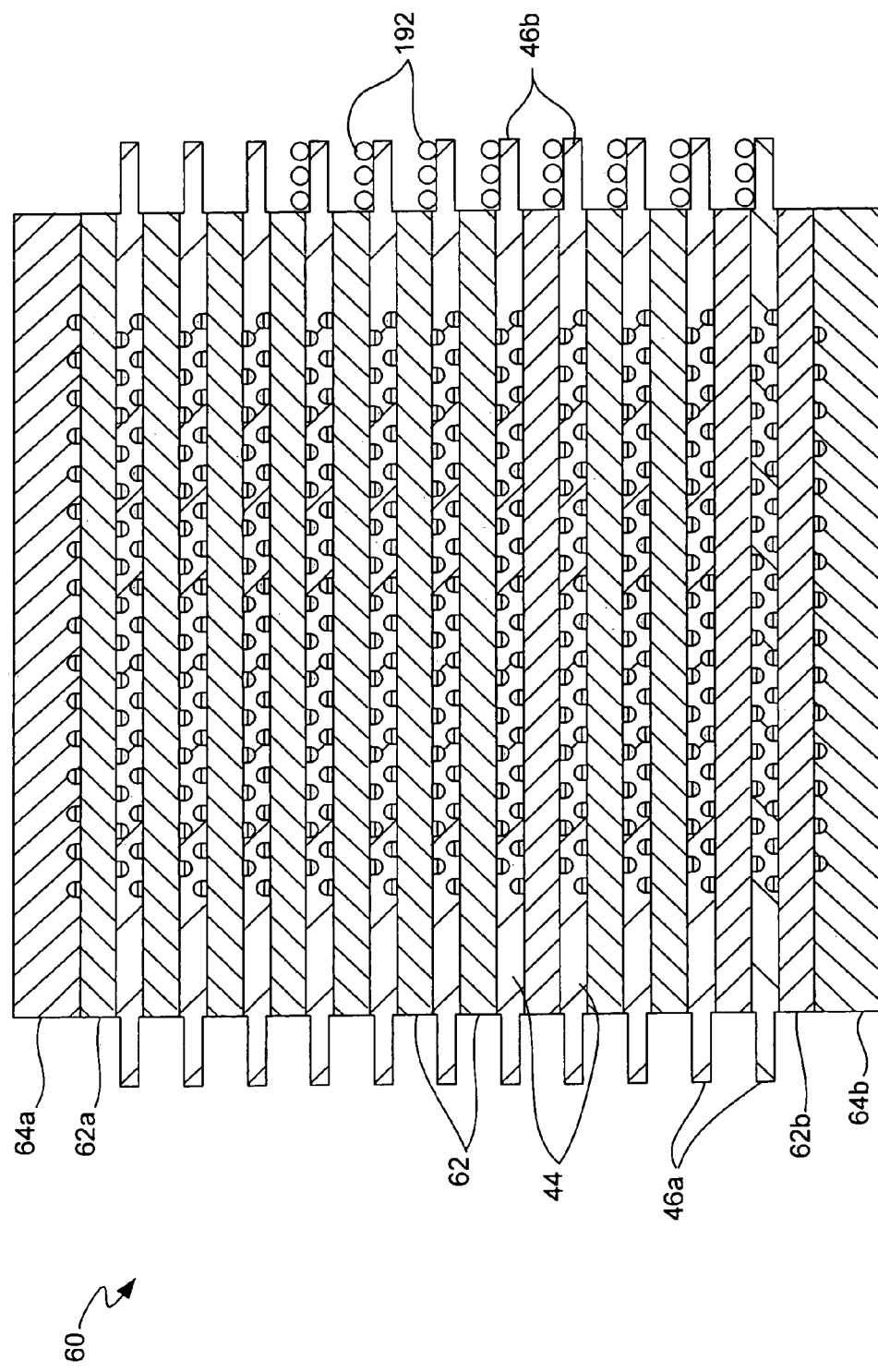
FIG. 2A illustrates a cross sectional view of a fuel cell stack for use in the fuel cell of FIG. 1A in accordance with one embodiment of the present invention.
Figure 2B:
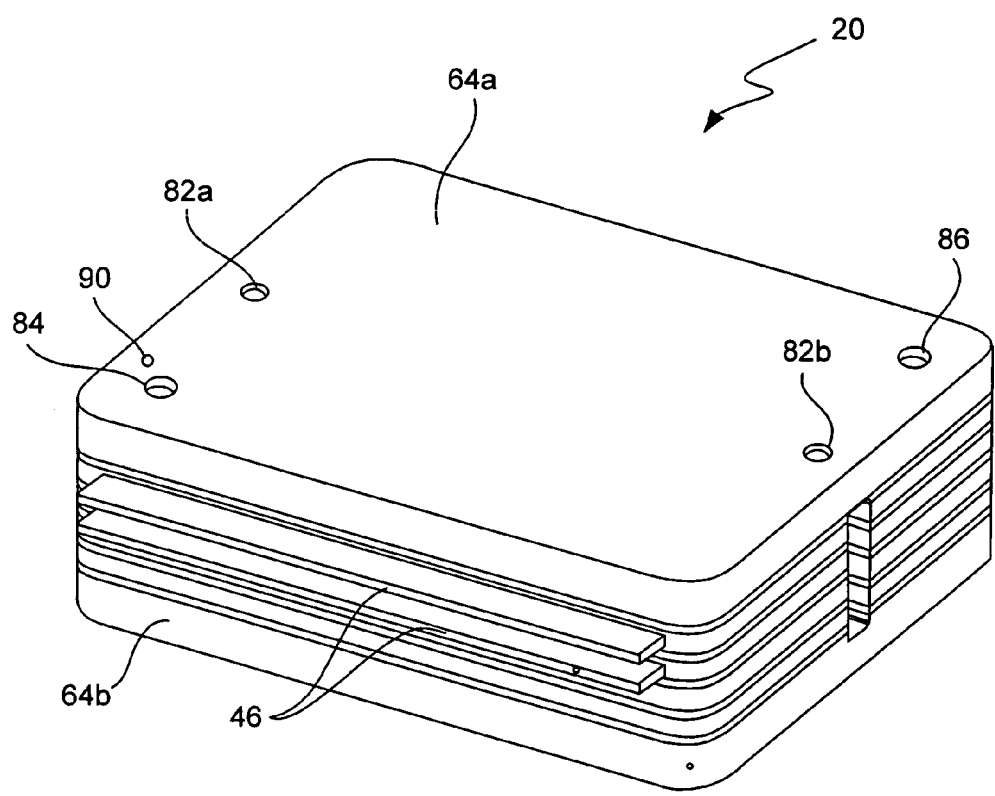
FIG. 2B illustrates an outer top perspective view of a fuel cell stack and fuel cell in accordance with another embodiment of the present invention.

FIG. 2A illustrates a cross sectional view of a fuel cell stack 60 for use in fuel cell 20 in accordance with one embodiment of the present invention. FIG. 2B illustrates an outer top perspective view of a fuel cell stack 60 and fuel cell 20 in accordance with another embodiment of the present invention.

Referring initially to FIG. 2A, fuel cell stack 60 is a bi-polar plate stack that comprises a set of bi-polar plates 44 and a set of membrane electrode assembly (MEA) layers 62. Two MEA layers 62 neighbor each bi-polar plate 44. With the exception of topmost and bottommost membrane electrode assembly layers 62a and 62b, each MEA 62 is disposed between two adjacent bi-polar plates 44. For MEAs 62a and 62b, top and bottom end plates 64a and 64b include a channel field 72 on the face neighboring an MEA 62. Bi-polar plates 44 are discussed in further detail with respect to FIGS. 2B-2I, 3, 4 and 5. Membrane electrode assembly 62 is discussed in further detail with respect to FIG. 2C.

Referring to FIG. 2B, top and bottom end plates 64a and 64b provide mechanical protection for stack 60. End plates 64 also hold the bi-polar plates 44 and MEA layers 62 together, and apply pressure across the planar area of each bi-polar plate 44 and each MEA 62. End plates 64 may comprise a suitably rigid material such as stainless steel, titanium, aluminum, a composite, or ceramic, for example. In one embodiment, end plates 64 are pre-bent before assembly to reduce pressure variance across the planar area of MEA layers 62. Pre-bent end plates are discussed in further detail below with respect to FIG. 6.

Bolts 82a and 82b connect and secure top and bottom end plates 64a and 64b together. As shown, bolts 82a and 82b enter through top end plate 64a and thread into receiving threads in bottom end plate 64b. Nuts may alternatively be disposed on the bottom side of bottom end plate 64b to receive and secure each bolt. Bolts 82a and 82b may comprise commercially available bolts, tie rods or another fastening mechanism suitable for connecting and securing top and bottom end plates 64a and 64b.

Referring back to FIG. 2A, bi-polar plate stack 60 includes twelve membrane electrode assembly layers 62, eleven bi-polar plates 44 and two end plates 64. The bi-polar plates 44 in stack 60 also each include two heat transfer appendages 46. More specifically, each bi-polar plate 44 includes a heat transfer appendage 46a on one side of the plate and a heat transfer appendage 46b on the opposite side. Heat transfer appendages 46 are discussed in further detail below with respect to FIGS. 2E, 3A and 3B.

The number of bi-polar plates 44 and MEA layers 62 in each set may vary with design of fuel cell stack 60. Stacking parallel layers in fuel cell stack 60 permits efficient use of space and increased power density for fuel cell 20. In one embodiment, each membrane electrode assembly 62 produces 0.7 V and the number of MEA layers 62 is selected to achieve a desired voltage. Alternatively, the number of MEA layers 62 and bi-polar plates 44 may be determined by the allowable thickness in an electronics device. Using one or more space savings techniques described below, fuel cell 20 may include more than 10 membrane electrode assembly layers and yet have an overall package thickness less than one centimeter. A fuel cell stack 60 having from one MEA 62 to several hundred MEAs 62 is suitable for many applications. A stack 60 having from about three MEAs 62 to about twenty MEAs 62 is also suitable for numerous applications. Fuel cell 20 size and layout may also be tailored and configured to output a given power.

Referring to FIG. 2B, fuel cell 20 includes two anode ports that open to the outside of fuel cell stack 60: an inlet anode port or inlet hydrogen port 84, and an outlet anode port or outlet hydrogen port 86. Inlet hydrogen port 84 is disposed on top end plate 64a, couples with an inlet line to receive hydrogen gas, and opens to an inlet hydrogen manifold 102 (see FIGS. 2E and 2F) that is configured to deliver inlet hydrogen gas to a channel field 72 on each bi-polar plate 44 in the stack 60. Outlet port 86 receives outlet gases from an anode exhaust manifold 104 (see FIGS. 2E and 2F) that is configured to collect waste products from the anode channel fields 72 of each bi-polar plate 44. Outlet port 86 may provide the exhaust gases to the ambient room directly or a line that couples to port 86 and outlets the exhaust gases to the ambient room.

Fuel cell 20 includes two cathode parts: an inlet cathode port or inlet oxygen port 88, and an outlet cathode port or outlet water/vapor port 90. Inlet oxygen port 88 is disposed on bottom end plate 64b (see FIG. 2F), couples with an inlet line to receive ambient air, and opens to an oxygen manifold 106 that is configured to deliver inlet oxygen and ambient air to a channel field 72 on each bi-polar plate 44 in stack 60. Outlet water/vapor port 90 receives outlet gases from a cathode exhaust manifold 108 (see FIGS. 2E and 2F) that is configured to collect water (typically as a vapor) from the cathode channel fields 72 on each bi-polar plate 44.

Figure 2C:
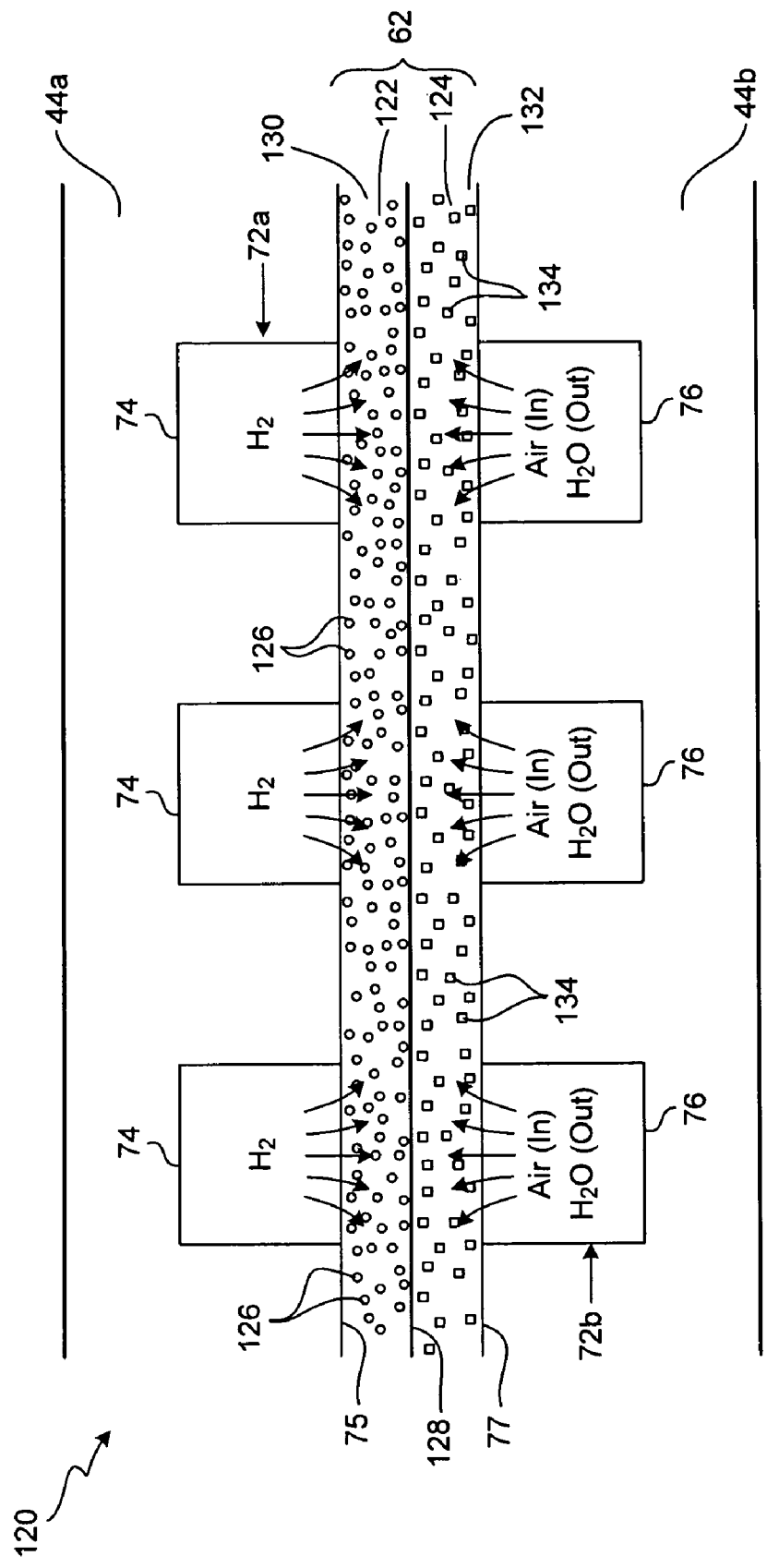
FIG. 2C illustrates a polymer electrolyte membrane fuel cell (PEMFC) architecture for the fuel cell of FIG. 1A in accordance with one embodiment of the present invention.

FIG. 2C illustrates a polymer electrolyte membrane fuel cell (PEMFC) architecture 120 for use in fuel cell 20 in accordance with one embodiment of the present invention. As shown, PEMFC architecture 120 comprises two bi-polar plates 44 and a membrane electrode assembly layer (or MEA) 62 sandwiched between the two bi-polar plates 44. The MEA 62 electrochemically converts hydrogen and oxygen to water, generating electricity and heat in the process. Membrane electrode assembly 62 includes an anode gas diffusion layer 122, a cathode gas diffusion layer 124, a hydrogen catalyst 126, ion conductive membrane 128, anode electrode 130, cathode electrode 132, and oxygen catalyst 134.

Pressurized hydrogen gas ($H_2$), such as that provided in a hydrogen bearing gas stream (or 'reformate'), enters fuel cell 20 via hydrogen port 84, proceeds through inlet hydrogen manifold 102 and through hydrogen channels 74 of a hydrogen channel field 72a disposed on the anode face 75 of bi-polar plate 44a. The hydrogen channels 74 open to anode gas diffusion layer 122, which is disposed between the anode face 75 of bi-polar plate 44a and ion conductive membrane 128. The pressure forces hydrogen gas into the hydrogen-permeable anode gas diffusion layer 122 and across the hydrogen catalyst 126, which is disposed in the anode gas diffusion layer 122. When an $H_2$ molecule contacts hydrogen catalyst 126, it splits into two H+ ions (protons) and two electrons (e−). The protons move through the ion conductive membrane 128 to combine with oxygen in cathode gas diffusion layer 124. The electrons conduct through the anode electrode 130, where they build potential for use in an external circuit (e.g., a power supply of a laptop computer) After external use, the electrons flow to the cathode electrode 132 of PEMFC architecture 120.

Hydrogen catalyst 126 breaks hydrogen into protons and electrons. Suitable catalysts 126 include platinum, ruthenium, and platinum black or platinum carbon, and/or platinum on carbon nanotubes, for example. Anode gas diffusion layer 122 comprises any material that allows the diffusion of hydrogen therethrough and is capable of holding the hydrogen catalyst 126 to allow interaction between the catalyst and hydrogen molecules. One such suitable layer comprises a woven or non-woven carbon paper. Other suitable gas diffusion layer 122 materials may comprise a silicon carbide matrix and a mixture of a woven or non-woven carbon paper and Teflon.

On the cathode side of PEMFC architecture 120, pressurized air carrying oxygen gas ($O_2$) enters fuel cell 20 via oxygen port 88, proceeds through inlet oxygen manifold 106, and through oxygen channels 76 of an oxygen channel field 72b disposed on the cathode face 77 of bi-polar plate 44b. The oxygen channels 76 open to cathode gas diffusion layer 124, which is disposed between the cathode face 77 of bi-polar plate 44b and ion conductive membrane 128. The pressure forces oxygen into cathode gas diffusion layer 124 and across the oxygen catalyst 134 disposed in the cathode gas diffusion layer 124. When an $O_2$ molecule contacts oxygen catalyst 134, it splits into two oxygen atoms. Two H+ ions that have traveled through the ion selective ion conductive membrane 128 and an oxygen atom combine with two electrons returning from the external circuit to form a water molecule ($H_2O$). Cathode channels 76 exhaust the water, which usually forms as a vapor. This reaction in a single MEA layer 62 produces about 0.7 volts.

Cathode gas diffusion layer 124 comprises a material that permits diffusion of oxygen and hydrogen protons therethrough and is capable of holding the oxygen catalyst 134 to allow interaction between the catalyst 134 with oxygen and hydrogen. Suitable gas diffusion layers 124 may comprise carbon paper or cloth, for example. Other suitable gas diffusion layer 124 materials may comprise a silicon carbide matrix and a mixture of a woven or non-woven carbon paper and Teflon. Oxygen catalyst 134 facilitates the reaction of oxygen and hydrogen to form water. One common catalyst 134 comprises platinum. Many designs employ a rough and porous catalyst 134 to increase surface area of catalyst 134 exposed to the hydrogen or oxygen. For example, the platinum may reside as a powder very thinly coated onto a carbon paper or cloth cathode gas diffusion layer 124.

Ion conductive membrane 128 electrically isolates the anode from the cathode by blocking electrons from passing through membrane 128. Thus, membrane 128 prevents the passage of electrons between gas diffusion layer 122 and gas diffusion layer 124. Ion conductive membrane 128 also selectively conducts positively charged ions, e.g., hydrogen protons from gas diffusion layer 122 to gas diffusion layer 124. For fuel cell 20, protons move through membrane 128 and electrons are conducted away to an electrical load or battery. In one embodiment, ion conductive membrane 128 comprises an electrolyte. One electrolyte suitable for use with fuel cell 20 is Celtec 1000 from PEMEAS USA AG of Murray Hill, N.J. (www.pemeas.com). Fuel cells 20 including this electrolyte are generally more carbon monoxide tolerant and may not require humidification. Ion conductive membrane 128 may also employ a phosphoric acid matrix that includes a porous separator impregnated with phosphoric acid. Alternative ion conductive membranes 128 suitable for use with fuel cell 20 are widely available from companies such as United technologies, DuPont, 3M, and other manufacturers known to those of skill in the art. For example, WL Gore Associates of Elkton, Md. produces the primea Series 58, which is a low temperature MEA suitable for use with the present invention.

Anode 130 refers to the lower potential or negative electrode for MEA layer 62 and conducts electrons that are freed from hydrogen molecules so they can be used externally. Anode 130 comprises anode gas diffusion layer 122, catalyst 126 and the electrically conductive nature of bi-polar plate 44. Thus, bi-polar plate 44 thus serves as both a) a plate with channels 76 formed into it that distribute hydrogen gases over an active area including catalyst 126 and b) an electrically conducting member of anode 130 in fuel cell 20. For fuel cell stack 60, the bi-polar plates 44 are connected in series to add the potential generated in each MEA 62. The cumulative anode 130 for fuel cell 20 then includes each bi-polar plate 44 connected in series and conducts electrons to an external electrical load (electricity is used) or battery (energy is stored).

Cathode 132 represents the positive electrode for fuel cell 20 and conducts electrons to catalyst 134, where they can recombine with hydrogen ions and oxygen to form water. Cathode 132 comprises cathode gas diffusion layer 124, catalyst 134 and the electrically conductive nature of bi-polar plate 44. Thus, bi-polar plate 44 serves as both a) a plate with channels 76 formed into it that distribute oxygen and air over an active area including catalyst 134 and b) an electrically conducting member of cathode 132 in fuel cell 20. The cumulative cathode 132 for fuel cell 20 includes each bi-polar plate 44 connected in series to conduct electrons back from the external electrical circuit.

Figure 2F:
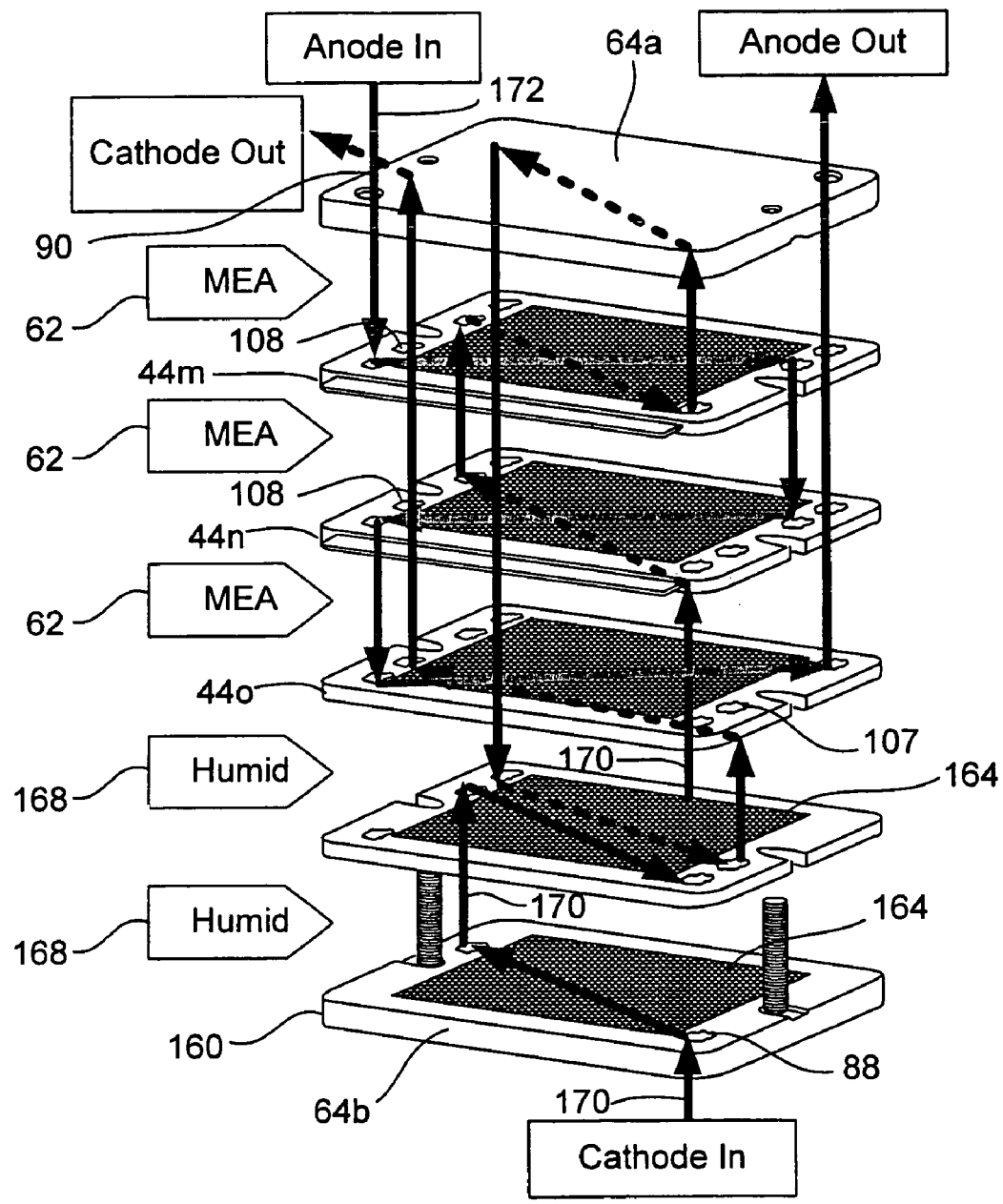
FIG. 2F illustrates humidification plates (HP) employed in a fuel stack in accordance with one embodiment of the present invention.

In one embodiment, fuel cell 20 requires no external humidifier or heat exchanger and the stack 60 only needs hydrogen and air to produce electrical power. Alternatively, fuel cell 20 may employ humidification of the cathode to fuel cell 20 improve performance. For some fuel cell stack 60 designs, humidifying the cathode increases the power and operating life of fuel cell 20. FIG. 2F illustrates humidification plates 160 employed in a fuel stack 60 in accordance with one embodiment of the present invention.

Humidification plates 160 comprise a substantially planar geometry and are defined by two opposing faces 162 that each include a humidification flow field 164 is disposed on each face 162 (only the top face and humidification flow field 164 are shown). A water permeable membrane 168 (such as Nafion) is disposed between each humidification plate 160. Cathode exhaust gas (from the bi-polar plates 44 that service MEA layers 62) is fed through one humidification flow field 164 of a humidification plate 160 and the cathode inlet gas (going to the bi-polar plates 44 that service MEA layers 62) is fed through the other humidification flow field 164. The membrane 168 allows water vapor to pass from one stream to the other, without allowing the different gas streams to mix. Water vapor and heat from the cathode exhaust stream is thus fed into the cathode inlet stream through the water permeable membrane 168, hence humidifying and heating the cathode inlet stream. The humidification flow fields 164 may be configured to allow counter flow, co-flow or cross flow between the cathode inlet and outlet streams.

In one embodiment, fuel cell stack 60 includes a number of humidification plates that is about 25-70% of the total number of bi-polar plates 44. Humidification plates 160 may be molded or machined plastic plates, for example. Humidification plates 160 need not be thermally or electrically conductive.

Although the present invention provides a bi-polar plate 44 having channel fields 72 that distribute hydrogen and oxygen on opposing sides of a single plate 44, many embodiments described herein are suitable for use with conventional bi-polar plate assemblies that employ two separate plates for distribution of hydrogen and oxygen. FIG. 2M illustrates a widely used and conventional bi-polar plate 300 that comprises a plate/cooling layer/plate architecture.

Bi-polar plate 300 includes two plates 302a and 302b that sandwich a cooling layer 304. Top plate 302a includes a channel field 306a on its top face 308 that distributes oxygen. Bottom plate 302b includes a channel field 306b on its bottom face 308 that distributes hydrogen (or oxygen when top plate 302a distributes hydrogen). Cooling layer 304 runs a cooling medium such as de-ionized water through cooling channels 310. The cooling medium actively cools each plate 302. The cooling medium may be routed such that the temperature increase occurs in the same direction as reducing oxygen partial pressure in the cathode. Similar to bi-polar plate 44, bi-polar plate 300 is referred to as a 'bi-polar plate' since it acts electrically as a cathode for one MEA and as an anode for another MEA. Bi-polar plate 300 serves similar functions for a fuel cell as those described above for bi-polar plate 44. Top and bottom plates 302a and 302b may each comprise silicon with channels etched in their faces to provide channel fields 306.

Although use of bi-polar plate 300 in fuel cell 20 leads to a thicker fuel cell relative to use of bi-polar plate 44, many embodiments of the present invention are well suited for use with bi-polar plate 300. For example, flow buffers as described with respect to FIG. 2E are well suited for used with bi-polar plate 300. In addition, fuel cells including bi-polar plates 300 in a stack will benefit from pre-bent end plates 64 as discussed with respect to FIG. 6. Bi-polar plate 300 may also employ staggered channels, heating appendages and/or flow fields as described herein.

In one embodiment, fuel cell 20 comprises bi-polar plates 44 that are arranged in a stack where each plate 44 has a different manifold layout. FIG. 2F illustrates a fuel cell stack 60 design where bi-polar plates include different inlet and exhaust distributions in accordance with another embodiment of the present invention.

For fuel stack 60 of FIG. 2F, the cathode gas stream 170 enters from the bottom plate 64b (where it may be closest to the air supply) and flows through two humidifier plate fields 164, flowing counter flow to the cathode exit streams, thereby picking up humidity and heat. The cathode gas stream 170 then flows through three MEAs 62 and to cathode exit manifold 108, which returns the stream 170 to humidification plates 160 where it passes over the incoming cathode gas stream 170. The cathode gas stream 170 is then exhausted from outlet port 90.

The anode stream 172 enters an inlet port 84 and flows serially from one top bi-polar plate 44 to the next, flowing counter flow to the cathode gas stream 170. The stream 172 first enters the bi-polar plate 44 that is the last bi-polar plate 44 in the cathode stream 170. Flowing the anode stream 172 and cathode stream 170 counter flow to each other reduces the cell potential loss associated with decreasing fuel and oxidant concentrations, since they are consumed by each of the MEA layers 62.

These fuel cell stack 60 flow paths permit a shorter plumbing path for reformate and cathode exit streams to and from the fuel processor. To enable this improved plumbing, the fuel cell stack 60 design shown in FIG. 2J demonstrates bi-polar plate 44 configurations that are each tailored for the specific location of the plate 44 in the fuel cell stack 60. More specifically, bi-polar plates 44m, 44n and 44o may each include a different inlet and exhaust manifold arrangements. For example, bi-polar plate 44o includes an extra cathode manifold 107 that bi-polar plate 44m does not. MEMs fabrication techniques, for example, allow for such varying manifold arrangements to be incorporated into bi-polar plates 44. The varying manifold arrangements then enable designers to develop complex flow patterns for bi-polar fuel cell stacks 60 with minimal additional cost.

While the present invention has mainly been discussed so far with respect to a reformed methanol fuel cell (RMFC), the present invention may also apply to other types of fuel cells, such as a solid oxide fuel cell (SOFC), a phosphoric acid fuel cell (PAFC), a direct methanol fuel cell (DMFC), or a direct ethanol fuel cell (DEFC). In this case, fuel cell 20 includes components specific to these architectures, as one of skill in the art will appreciate. A DMFC or DEFC receives and processes a fuel. More specifically, a DMFC or DEFC receives liquid methanol or ethanol, respectively, channels the fuel into the fuel cell stack 60 and processes the liquid fuel to separate hydrogen for electrical energy generation. For a DMFC, channel fields 72 in the bi-polar plates 44 distribute liquid methanol instead of hydrogen. Hydrogen catalyst 126 described above would then comprise a suitable anode catalyst for separating hydrogen from methanol. Oxygen catalyst 128 would comprise a suitable cathode catalyst for processing oxygen or another suitable oxidant used in the DMFC, such as peroxide. In general, hydrogen catalyst 126 is also commonly referred to as an anode catalyst in other fuel cell architectures and may comprise any suitable catalyst that removes hydrogen for electrical energy generation in a fuel cell, such as directly from the fuel as in a DMFC. In general, oxygen catalyst 128 may include any catalyst that processes an oxidant in used in fuel cell 20. The oxidant may include any liquid or gas that oxidizes the fuel and is not limited to oxygen gas as described above. An SOFC, PAFC or MCFC may also benefit from inventions described herein, for example. In this case, fuel cell 20 comprises an anode catalyst 126, cathode catalyst 128, anode fuel and oxidant according to a specific SOFC, PAFC or MCFC design.

3. Bi-Polar plates

FIG. 2D illustrates top perspective view of a bi-polar plate 44 in accordance with one embodiment of the present invention. FIG. 2E illustrates a top elevated view of bi-polar plate 44. Bi-polar plate 44 is a single plate 44 with a first channel field 72a and a second channel field 72b disposed on opposite faces 75a and 75b, respectively, of a single plate 44.

Functionally, bi-polar plate 44 a) delivers and distributes reactant gasses to the gas diffusion layers 122 and 124 and their respective catalysts, b) maintains separation of the reactant gasses from one another between MEA layers 62 in stack 60, c) exhausts electrochemical reaction byproducts from MEA layers 62, d) facilitates heat transfer to and/or from MEA layers 62 and fuel cell stack 60, e) acts as an electronic conductor to transport electrons from the anode to the cathode, and f) includes gas intake and gas exhaust manifolds for gas delivery to other bi-polar plates 44 in the fuel stack 60.

Structurally, bi-polar plate 44 has a relatively flat profile and includes opposing top and bottom faces 75a and 75b (only top face 75a is shown in FIGS. 2D and 2E, see FIG. 2C for 75b) and a number of sides 78a-d. Faces 75 are substantially planar with the exception of channels 76 formed as troughs into substrate 89. Sides 78a-d comprise portions of bi-polar plate 44 proximate to edges of bi-polar plate 44 between the two faces 75. As shown in FIG. 2E, bi-polar plate 44 is roughly quadrilateral with features for the intake manifolds, exhaust manifolds and heat transfer appendage 46 that provide deviation from the quadrilateral shape. A bi-polar plate 44 thickness from about 0.125 millimeters to about 1 millimeter between faces 75 is suitable for many applications. Other applications may employ a thickness between about 0.25 millimeters to about 0.75 millimeters. In a specific embodiment, plate 44 has a thickness no greater than about 2 millimeters at any point in the plate 44 profile. In another embodiment, plate 44 has an original thickness of 1 mm before any machining. In this case, fuel cells 20 having an overall package thickness less than 1 cm are attainable.

The manifold on each plate 44 is configured to deliver a gas to a channel field on a face of the plate 44 or receive a gas from the channel field 72. The manifolds for bi-polar plate 44 include apertures or holes in substrate 89 that, when combined with manifolds of other plates 44 in a stack 60, form an inter-plate 44 gaseous communication manifold (such as 102, 104, 106 and 108). Thus, when plates 44 are stacked and their manifolds substantially align, the manifolds permit gaseous delivery to and from each plate 44.

Bi-polar plate 44 includes a channel field 72 or "flow field" on each face of plate 44. Each channel field 72 includes one or more channels 76 formed into the substrate 89 of plate 44 such that the channel rests below the surface of plate 44. Each channel field 72 distributes one or more reactant gasses to an active area 85 for the fuel cell stack 60. Bi-polar plate 44 includes a first channel field 72a on the anode face 75a of bi-polar plate 44 that distributes hydrogen to an anode (FIG. 2C), while a second channel field on opposite cathode face 75b distributes oxygen to a cathode. Specifically, channel field 72a includes multiple channels 76 that permit oxygen and air flow to anode gas diffusion layer 122, while channel field 72b includes multiple channels 76 that permit oxygen and air flow to cathode gas diffusion layer 124. For fuel cell stack 60, each channel field 72 is configured to receive a reactant gas from an intake manifold 102 or 106 and configured to distribute the reactant gas to a gas diffusion layer 122 or 124. Each channel field 72 also collects reaction byproducts for exhaust from fuel cell 20. When bi-polar plates 44 are stacked together in fuel cell 60, adjacent plates 44 sandwich an MEA layer 62 such that the anode face 75a from one bi-polar plate 44 neighbors a cathode face 75b of an adjacent bi-polar plate 44 on an opposite side of the MEA layer 62.

Each channel field 72 includes a set of channels configured to distribute oxygen to an active area of the bi-polar plate. The number and configuration of channels 76 in each channel field 72 may vary with design. FIGS. 2G-2L show several channel field 72 configurations suitable for use with fuel cell 20.

An active area 85 for fuel cell 20 refers to a portion of the fuel cell stack 60 in which an electrochemical reaction for energy production occurs. Typically, an active area 85 requires both the functionality of MEA layer 62 (and its constituent parts such as gas distribution layers 122 and 124, associated catalysts, and ion conductive membrane 128) and gas distribution by channel fields 72. Thus, areas of the MEA layer 62 serviced by the channel fields 72 may define active areas 85. Conversely, areas outside the distribution and planar area of channel fields 72 are not included in the active area 85, and areas outside the planar area of MEA layer 62 are not included in the active area 85. Depending on configuration, a single MEA layer 62 may include multiple active areas 85. The multiple active areas 85 need not be continuous and a single MEA layer need not be restricted to a single continuous active area 85.

Channel fields 72 are located in a central portion of plate 44. A sealing portion 87 of plate 44 borders channel field 72 about the periphery of each plate 44. The sealing portion 87 surrounds the channel fields 72 and surrounds manifolds 102-108 about the periphery of plate 44. The sealing portion 87 seals the MEA layer 62 and manifolds 102-108. A gasket may be disposed between the sealing portions 87 of adjacent plates 44 to facilitate a tight seal. Pressure from bolts 82 and end plates 64 then compresses a gasket between each pair of adjacent plates 44. A screen printed gasket made from silicone is suitable for many fuel cell stacks 60. In another embodiment, substrate 89 is raised for bi-polar plate 44 at sealing portion 87 relative to substrate 89 in the central portion of plate 44. In this case, MEA layer 62 rests in the lower recessed portion and the raised substrate 89 in sealing portions 87 of adjacent plates 44 acts as the seal when pressed together by bolts 82 and end plates 64.

Channel fields 72 affect the performance of fuel cell 20. More specifically, design of channel fields 72 may alter the planar consistency of gas distribution between bi-polar plates 44, which affects electrical power output. One embodiment of the present invention improves fuel cell 20 performance by tailoring channel fields 72 according to the design of fuel cell 20. In general, since fuel cell 20 employs lateral heat conduction for heat removal during energy production, and each bi-polar plate 44 operates at a substantially constant temperature, one or more of the following parameters may affect configuration and layout of channel fields 72: maximizing a Nernst potential across the membrane electrode assembly 62, optimized water management in the fuel cell stack 60 (water partial pressure distribution and liquid water removal), electric resistance, and/or optimizing pressure consistency or drop in the individual layers.

FIGS. 2G-2L illustrate several exemplary channel fields 72a-72g suitable for use with fuel cell 20. In one embodiment, channel fields 72 disposed on opposing faces of adjacent bi-polar plates 44 in fuel cell 20 distribute oxygen and hydrogen gas in directions counter to each other to maximize the Nernst potential of the cell.

Figure 2G:
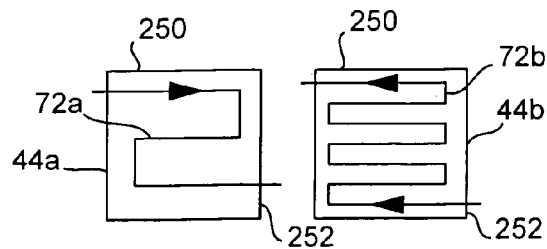
FIGS. 2G-2L show several exemplary channel field configurations suitable for use with the fuel cell of FIG. 1A.

As shown in FIG. 2G, a channel field 72a on the bottom (or top) of bi-polar plate 44a starts oxygen flow in an upper left corner 250 and finishes oxygen flow in a lower right corner 252. In this case, the oxygen intake duct 106 provides fresh oxygen to upper left corner 250 and the air exhaust duct 108 (FIG. 2E) receives depleted oxygen air from lower right corner 252. Conversely, opposing channel field 72b on the top (or bottom) facing surface of adjacent bi-polar plate 44b starts hydrogen flow in the lower right corner 252 and finishes hydrogen flow in upper left corner 250. Similarly, the hydrogen intake duct 102 provides fresh hydrogen to lower right corner 252 and the hydrogen exhaust duct 104 receives depleted hydrogen from upper left corner 250. The flow patterns shown in FIG. 2F are exemplary and it is understood that channel field 72a may distribute oxygen as described or conversely channel field 72a may distribute hydrogen to the anode while channel field 72b distributes oxygen to the cathode.

Figure 2H:
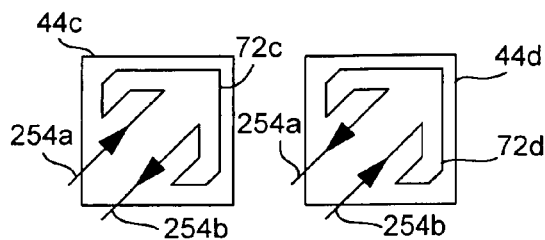
Figure 2J:
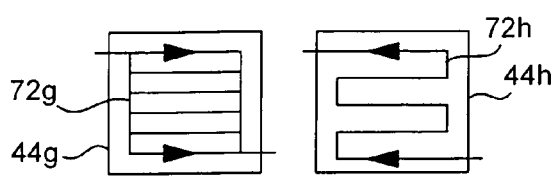

As shown in FIG. 2H, channel fields 72c and 72d on opposing faces of adjacent bi-polar plates 44c and 44d follow a similar planar flow pattern, but in opposing directions. More specifically, channel field 72c starts oxygen flow in a first portion 254a of a lower left corner 254 of bi-polar plate 44c and finishes oxygen flow in a second portion 254b of the lower left corner 254. Between start and finish on the same corner, channel field 72c distributes oxygen about bi-polar plate 44c along an exemplary circuitous path that covers the active area serviced by bi-polar plate 44c. More elaborate distribution paths are possible and contemplated. Channel field 72d conversely starts oxygen flow in a matching second portion 254b of a lower left corner 254 of bi-polar plate 44d and finishes oxygen flow in a matching first portion 254a of the lower left corner 254. In this case, channel field 72d traces the same circuitous path as channel field 72c, but in an opposite direction.

Figure 2I:
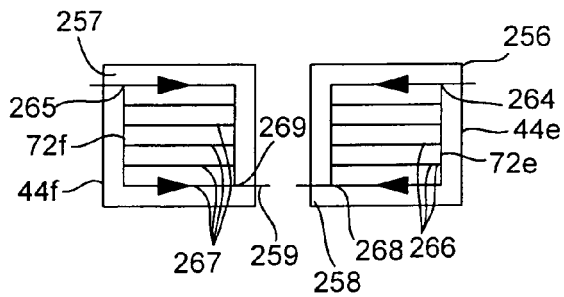

Channel distribution patterns illustrated in FIGS. 2G and 2H show serial flow patterns in which flow in each channel field 72a-d follows a single channel as it traverses the plate 44 face and active area. Bi-polar plates 44 of the present invention may also employ parallel channel field schemes in which flow proceeds along multiple paths between one or more common flow terminals along the flow path. As shown in FIG. 2I, channel fields 72e and 72f on opposing faces of adjacent bi-polar plates 44e and 44f follow counter-parallel paths. More specifically, channel field 72e starts oxygen flow in an upper right corner 256 of bi-polar plate 44e and finishes oxygen flow in a lower left corner 258. Oxygen flow from upper right corner 256 of plate 44e divides at a common flow terminal 264 into six substantially parallel channels 266 that deliver the oxygen across the plate 44e face and active area before recombining at common flow terminal 268 near lower left corner 258. Conversely, hydrogen flow from upper left corner 257 of plate 44f divides at a common flow terminal 265 into six substantially parallel channels 267 that deliver the oxygen across the plate 44e face and active area before recombining at common flow terminal 269 near lower right corner 259. In this manner, channel fields 72e and 72f deliver and distribute hydrogen and oxygen in counter directions across the active areas serviced by bi-polar plates 44e and 44f.

Figure 2K:
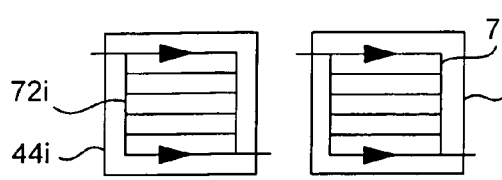
Figure 2L:
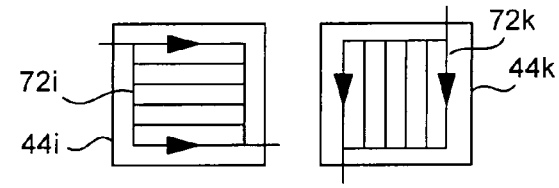
Figure 2M:
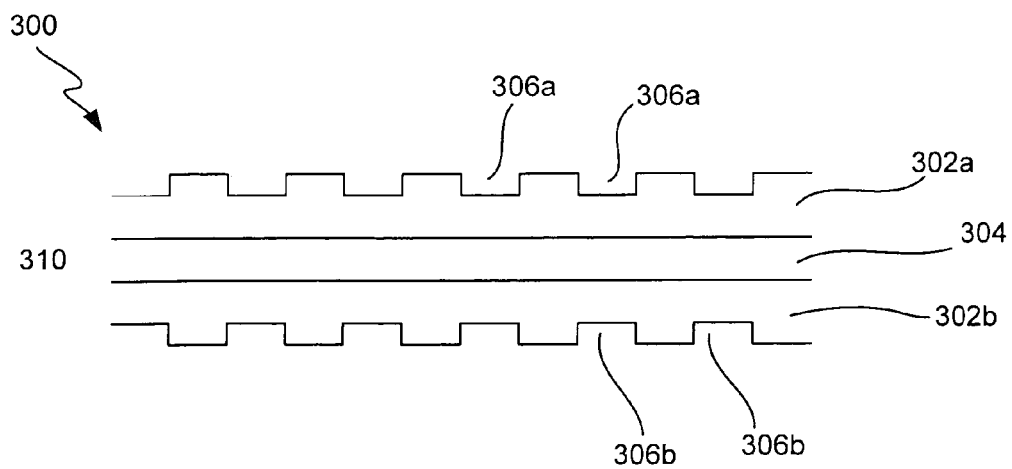
FIG. 2M illustrates a widely used and conventional bi-polar plate that comprises a plate/cooling layer/plate architecture.

FIG. 2K shows channel fields 72i and 72j on opposing faces of adjacent bi-polar plates 44i and 44j that follow a "co-flow" pattern in the same direction. In this case, the fields 72i and 72j start and finish oxygen and hydrogen flow at the same sides of each plate 44. FIG. 2L shows channel fields 72i and 72k on opposing faces of adjacent bi-polar plates 44i and 44k that follow a "cross-flow" pattern in a perpendicular direction.

Bi-polar plates 44 for fuel cell 20 may also use combined techniques described above. For example, FIG. 2J illustrates channel fields 72g and 72g on opposing faces of adjacent bi-polar plates 44g and 44h that employ a parallel scheme and serial scheme, respectively.

Bi-polar plate 44 comprises a substrate 89 that represents the one or more materials on which channels 72 are formed. Substrate 89 materials may be adapted based on application. In one embodiment, substrate 89 comprises a thermally conductive material. Advantages and usage of thermally conductive bi-polar plates 44 are described below with respect to FIGS. 3A, 3B and 5. In a specific embodiment, each plate 44 is thermally conductive and substrate includes a thermal conductance greater than 1 W/mK. A thermally conductive substrate 89 may comprise a metal such as aluminum or copper or comprise a graphite-composite material. Other materials suitable for use with substrate 89 include 316SS or 316SSL stainless steel, 50/50 nickel chrome, titanium, Fe, Ni, Cr and their alloys.

In another embodiment, substrate 89 comprises an electrically conductive material. Metals such as aluminum and copper are thus suitable for use for use with bi-polar plate 44. Alternatively, substrate 89 may comprise a non-electrically conductive material such as silicon or glass. In this case, plate 44 is coated with an electrically conductive layer that increases electrical conductance of bi-polar plate 44. Electrically conductive substrates 89 permit bi-polar plate 44 to have an overall thickness substantially less than graphite composite plates, which reduces the stack 60 thickness and size.

Bi-polar plate 44 may also include one or more coatings applied over substrate 89. For example, a coating may be added to serve as a corrosion barrier for a metal substrate 89. Suitable corrosion coatings may comprise a non-corroding polymeric matrix or a pure polymeric material, for example.

Bi-polar plate 44 may also be coated with an electrically conductive metal alloy or polymeric materials to improve conductance. The electrically conductive coating a) increases the planar electrical conductivity of bi-polar plate 44 between central portions of the substrate and peripheral portions that include heat transfer appendages 46, and b) enhances current transfer between bi-polar plate 44 and MEA 62. The conductive coating also serves as an electronic conduction path when the plates 44 are formed from non-conductive materials. The electrically conductive layer may include graphite, a conductive metal alloy or polymeric material for example. In one embodiment, planar resistance through bi-polar plate 44 is commonly less than 100 mOhm $cm^2$, whether achieved with a conductive substrate 89 material or via an external conductive coating.

Some coatings may be applied to serve as both a corrosion barrier and as an electrically conductive layer. For example, a non-corroding ceramic material that features high electrical conductivity will both increase electrical conductivity and act as a corrosion barrier. Similarly, a polymeric material mixed with a blend of electrically conductive materials such as graphite powder or carbon nano-tubes of different or similar sizes will also dually serve as both a corrosion barrier and as an electrically conductive layer. Conductive anti-corrosion coating materials for use with plate 44 having a surface resistance less than 100 mΩ cm2 include most metals, conductive ceramics and polymers, pure chemical or alloy. Some specific examples include Titanium Carbide, Titanium Carbonitride, Niobium, rhenium, titanium boride, chromium nitride, Au, Ni, Cu, Ti, CR, Mo and their alloys, conductive ceramics, graphite composite, conductive polymer includes, polypyrrole, polyphenylene, polyanilne, etc, homopolymer and copolymer compounds.

The relatively small size of fuel cell 20 and bi-polar plates 44 permits the use of non-traditional and relatively expensive coatings on bi-polar plates 44. The relatively expensive coatings may comprise gold, titanium carbide, titanium nitride or composite materials, for example. Fuel cell manufactures of large fuel cells (2 kW and up) typically avoid costly plate coatings due to the high cost of coating many square meters of material. However, for small fuel cells 20, the low cost of the molded plate and the performance increase associated with an integrated plate (increased performance reduces the overall size of the plates 44, reduces the MEA 62 size and amount of catalyst required), and outweighs the cost of the coating. The use of gold and other costly coatings for fuel cell 20 thus further demonstrates fuel cell 20 novelty relative to conventional large fuel cell technology for which the use of gold on plates larger than two square feet would be costly.

Bi-polar plates 44 may be constructed using a number of techniques. In one embodiment, metal bi-polar plates 44 are micro-machined from a metal sheet. Metal sheets may also be molded, cast, stamped or machined (e.g., milled) to form the bi-polar plate 44, channels 76 and flow fields 72. MEMS manufacturing techniques advantageously permit bi-polar plate 44 features to differ from fuel cell to fuel cell with minimal increase in plate 44 cost. For example, varying channel fields 72 as described with respect to FIGS. 2G-2L may be easily achieved in low volumes. In addition, inlet and outlet manifolds and gas ports can be placed in different locations for individual bi-polar plates 44 of a single fuel cell stack 60 to suit an orientation of a particular fuel cell 20 design or to permit strategic flows between plates 44 (see discussion for FIG. 2F).

4. Staggered Channels

Figure 4A:
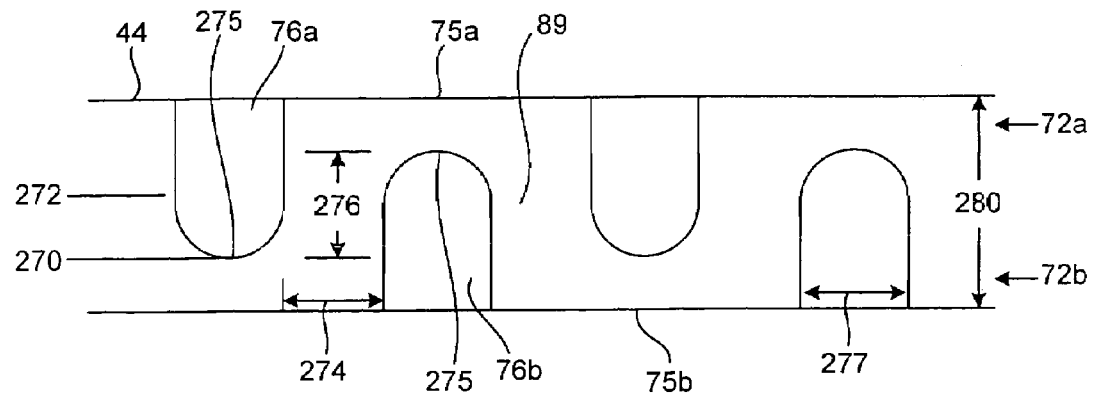
FIG. 4A illustrates staggered channels disposed on a bi-polar plate in accordance with one embodiment of the present invention.
Figure 4B:
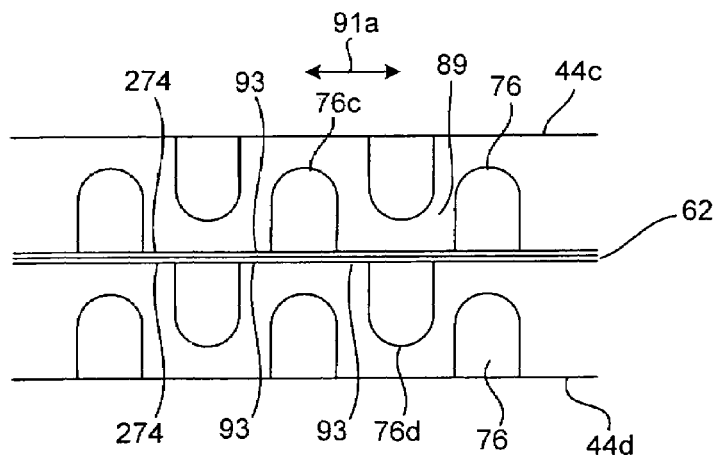
FIG. 4B illustrates bi-polar plates disposed on opposite sides of a membrane electrode assembly in accordance with one embodiment of the present invention.

In one embodiment of the present invention, bi-polar plates 44 include 'staggered' channels 76 that a) reduce the thickness of bi-polar plates 44 and/or b) reduce local forces applied by adjacent bi-polar plates 44 onto MEA layer 62 components. FIG. 4A illustrates staggered channels 76 disposed on a bi-polar plate 44 in accordance with one embodiment of the present invention. FIG. 4B illustrates bi-polar plates 44c and 44d disposed on opposite sides of MEA layer 62 in accordance with another embodiment of the present invention. The bi-polar fuel stack 60 of FIG. 2A also includes staggered channels 76.

A depth 270 for channel 76a is determined by the distance, perpendicular to the surface of plate 44, into the substrate that a channel bottom 275 penetrates or opens to. As shown in FIG. 4A, channels 76a and 76b on opposite faces 75a and 75b of a single bi-polar plate 44 are laterally offset such that the channels 76a and 76b do not intersect with each other as they penetrate into substrate 89. This permits a channel 76a included in a first channel field 72a on the top face to have a channel depth 270 that extends past a channel depth 272 for a channel 76b included in a channel field 72b on opposite face 75b of the same bi-polar plate. Channels 76a on a channel field 72a for one face of bi-polar plate 44 are thus all staggered such that they do not laterally intercept (along a direction coplanar with a surface of face 75a) any channels 76b in channel field 72b. An overlapping depth extension 276 quantifies the amount by which a channel bottom from one channel 76a approximately extends beyond a channel bottom from a channel 76b on the opposite surface of a common bi-polar plate. The overlapping depth extension 276 may be represented by an intended extension in design or an average extension in manufacture and implementation.

Figure 3A:
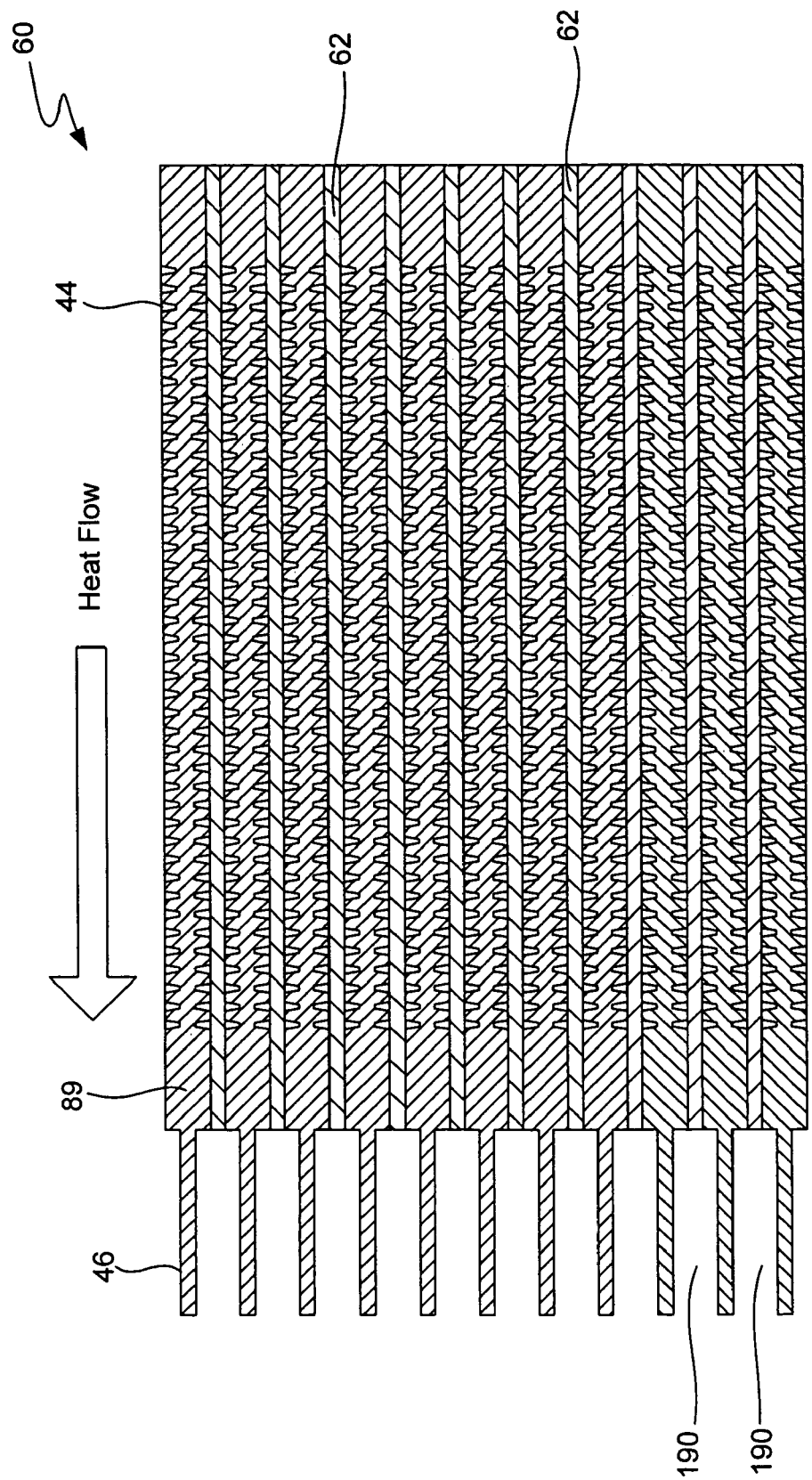
FIG. 3A illustrates a cross sectional view of a fuel cell stack including one heat transfer appendage on each bi-polar plate in accordance with one embodiment of the present invention.

Conversely, bi-polar plates 44 of FIG. 3A illustrate conventional and non-staggered channels 76. In this case, channels on opposing faces of the same bi-polar plate 44 align with each other vertically. The bi-polar plate 44 thickness is then limited to being at least: the depth of a channel on one face plus the depth of a channel on the opposite face plus a thickness of substrate material between the two channels 76. For example, a conventional and non-staggered bi-polar plate having channel depths of 20 mils and a thickness of substrate 89 material between the two channels of 10 mils provides a bi-polar plate with a 50 mil thickness. However, staggered channels 76 as shown in FIG. 4B may extend past each other and permit thinner bi-polar plates 44. With an overlapping depth extension 276 of 10 mils for example, a bi-polar plate 44 having the same 20 mil channels 76 would only have a thickness of 30 mils, which correlates to a 40% savings in thickness. For a fuel cell stack 60 having fifty bi-polar plates 44, this correlates to an inch less in thickness for the fuel cell stack 60 and fuel cell 20.

Staggered channels of the present invention thus permit bi-polar plate 44 to include a channel 76b having a channel bottom 275 that extends past a mid-section of plate 44. In general, staggered channels 76 of the present invention permit bi-polar plate 44 to have a thickness 280 less than 2x, where x is the approximate depth of channels used on each face 75 of the plate 44. In one embodiment, bi-polar plates 44 of the present invention include channels 76 on either face 75 of plate 44 with a channel depth 270 and 272 greater than 10 mils. In this case, bi-polar plate 44 includes a thickness 280 less than 20 mils. In another embodiment, bi-polar plates 44 of the present invention include channels 76 on either face 75 of plate 44 with a channel depth 270 and 272 greater than 20 mils. In this case, bi-polar plate 44 includes a thickness 280 less than 40 mils.

A landing surface area 274 on face 75 of plate 44 characterizes and quantifies the lateral offset 274 between channels 76a and 76b on opposite faces 75a and 75b. Planar area included in the landing surface area 274 spans the thickness of plate 44 between the opposite faces of the bi-polar plate 44. When bi-polar plates 44 are layered in a fuel cell stack 60 and as shown in FIGS. 4B and 2A, facing channels 76 (e.g., channels 76c and 76d) on opposing faces of adjacent bi-polar plates 44 are staggered such that they do not overlap. This permits landing surface areas 274 on opposing faces of adjacent bi-polar plates 44 to at least partially overlap on opposite sides of MEA layer 62.

A channel width 277 quantifies the planar width of a channel 76 relative to a face of plate 44. In one embodiment, the ratio of lateral offset 274 (A) to channel width 277 (B) is proportional to conductivity for stack 60. In some cases, A/B is inversely proportional to the maximum current density. A/B ratios between about 1/10 and about 3 are suitable for many applications. An A/B ratio of about 1/2 is also acceptable.

The bi-polar plates 44 of FIG. 3A illustrate conventional and non-staggered channels 76 in which the channels substantially align. While FIG. 3A exaggerates the thickness of MEA layer 62 for illustration, the thickness of FIG. 3A in reality is often minimal (less than 1 millimeter) and often gets pinched in channels 76 of adjacent bi-polar plates 44. For example, MEA layer 62 may comprise one or more compliant carbon layers as gas distribution layers 122 and 124. Since the pressure on layers of the fuel cell stack 60 applied by bolts 80 can surpass 100 psi, the compliant MEA layers can easily be forced into channels 76, compressed, pinched, and compromised.

In contrast, landing surface areas 274c and 274d on adjacent bi-polar plates 44c and 44d of FIG. 4B at least partially overlap in one or more lateral directions 91 of the plate 44 surfaces. This provides a common lateral surface 93 of contact through the MEA 62 between plates 44c and 44d. The common surface increases the surface area interaction between neighboring plates 44 and permits regions of common mechanical support and reduced pressure between bi-polar plates 44c and 44d. This reduces local stresses on MEA layer 62.

In one embodiment, the common lateral surface 93 includes at least half the surface area of bi-polar plate 44c disposed between a channel 76c on plate 44c and a nearest channel 76d on plate 44d. In another embodiment, the common lateral surface 93 includes at least ten percent of the surface area of bi-polar plate 44c disposed between two adjacent channels 76 on plate 44c.

5. Flow Buffers

The present invention also provides bi-polar plates 44 that include flow buffers to improve delivery of reactant gases and removal of reaction products. FIG. 2E illustrates a flow buffer 150 for improving gas flow in a fuel cell in accordance with one embodiment of the present invention. Plate 44 includes a channel field 72 divided into four channel sets 76e-76i. Each channel set includes multiple substantially straight and substantially parallel channels 76.

Bi-polar plate includes four flow buffers 150a-d. Flow buffer 150a is configured to receive oxygen from four manifold channels 76e that receive oxygen from inlet oxygen manifold 106. The manifold channels 76e provide gaseous communication between flow buffer 150a and oxygen manifold 106. Flow buffer 150a is also configured to output the oxygen to five channels 76f that span the width of an active area for plate 44 and provide gaseous communication between flow buffer 150a and flow buffer 150b. Flow buffer 150b is configured to receive oxygen from the five channels 76f and output the oxygen into five channels 76g (via the higher pressure in channels 76f than in channels 76g). Flow buffer 150c is configured to receive oxygen from the five channels 76g and output the oxygen into five channels 76h. Flow buffer 150d is configured to receive oxygen from the five channels 76h and output the oxygen into three channels 76i, which provide the oxygen to output manifold 108.

Since each channel 76 for the cathode side of bi-polar plate 44 also collects waste products of the electrochemical reaction, each channel 76 shown in FIG. 2E is also responsible for the collection of waste products. Flow buffers 150 thus also facilitate the removal of byproducts from MEA 62. In addition, although flow buffers 150a-d will be described with respect to servicing the cathode side of bi-polar plate 44, it is understood that the opposite side of bi-polar plate 44 may include one or more buffers 150 to improve gaseous flow on the anode side and delivery of hydrogen.

Flow buffers 150 provide common storage areas for flow of oxygen between channels 76 and permit for more robust gaseous flow for each channel field 72. If an individual channel 76 becomes blocked or otherwise witnesses a pressure disturbance or fluctuation, the downstream buffer 150 it feeds minimizes downstream compromise caused by the pressure disturbance. The downstream buffer 150c accommodates a sudden pressure change in a single channel 76 in channel set 76g by permitting the four other channels 76 in set 76g that supply gas to buffer 150c to feed all five channels that outlet from buffer 150c. Traditionally, a channel serially traverses across a large portion of a plate with multiple bends and services a large portion of the MEA. In the event of a blockage, all downstream portions of this serial channel become compromised, resulting in a large proportion of the MEA losing gas delivery and functionality (especially if the blockage occurs early). Conversely, if one of the channels 76 in channel set 76g becomes blocked or otherwise altered, gaseous accumulation in flow buffer 150c prevents the local disturbance from compromising gaseous provision to the remainder of the plate 44. Flow buffer 150c is configured with a volume that reduces pressure differences between the blocked channel 76 and another channel in set 76g before outputting oxygen to a channel 76 in channel set 76h. In one embodiment, a flow buffer includes a volume ten times that of a single flow channel. For a flow buffer 150 having the same depth the flow channels 76, the flow buffer may then include ten times the surface area of a single flow channel. A ratio of channel 76 thickness (d) to buffer thickness (D) may also be used when the flow buffer 150 and flow channels 76 share a common depth. Thickness ratios (d/D) from about 1/2 to about 1/20 are suitable for some applications.

In addition, an upstream buffer also helps to overcome a pressure disturbance or fluctuation in a channel by passively feeding other channels according to the pressure change. In the previous example, if one of the channels 76 in channel set 76g becomes blocked or otherwise altered, buffer 150b witnesses a pressure increase due to the upstream blockage and re-routes gases down the other four channels 76 in channel set 76g. Buffer 150c then sees a substantially similar pressure despite the blockage.

By minimizing effects of local pressure fluctuations, buffers 150 thus equalize pressure distribution and reduce pressure variance for an active area serviced by bi-polar plate 44. This improves fuel cell 20 performance. Although the bi-polar plate 44 shown in FIG. 2E includes four flow buffers 150, it is understood that bi-polar plate 44 my include more or less buffers 150 depending in the layout of channel field 72. In one embodiment, bi-polar plate 44 includes from one to ten buffers 150.

6. Heat Management

The present invention also improves thermal management of a fuel cell. To do so, a bi-polar plate may include one or more heat transfer appendages. FIG. 2E illustrates a top elevated view of a bi-polar plate 44 including one heat transfer appendage 46. FIG. 3A illustrates a cross sectional view of a fuel cell stack 60 including one heat transfer appendage 46 disposed on each bi-polar plate 44 in accordance with one embodiment of the present invention. FIG. 3B illustrates a cross section of a heat transfer appendage 46 and plate 44 in accordance with one embodiment of the present invention. FIG. 2A illustrates a cross sectional view of a fuel cell stack 60 including two heat transfer appendages 46 disposed on each bi-polar plate 44.

Heat transfer appendage 46 permits external thermal management of internal portions of fuel cell stack 60. More specifically, appendage 46 may be used to heat or cool internal portions of fuel cell stack 60 such as internal portions of each attached bi-polar plate 44 and any neighboring MEA layers 62, for example. Heat transfer appendage 46 is laterally arranged outside channel field 72. Lateral arrangement refers to position or arrangement according to a flat surface of plate 44. Planar coordinates such as linear coordinates 91a and 91b on a surface of plate 44 (FIG. 2E) are helpful to characterize planar arrangements for plate 44. Thus, lateral arrangement outside channel field 72 refers to heat transfer appendage 46 being disposed outside channel field 72 according to the planar coordinates 91a and 91b. In one embodiment, appendage 46 is disposed on an external portion of bi-polar plate 44. External portions of bi-polar plate 44 include any portions of plate 44 proximate to a side or edge of the substrate included in plate 44. External portions of bi-polar plate 44 typically do not include a channel field 72. For the embodiment shown in FIG. 2E, heat transfer appendage 46 substantially spans a side of plate 44 that does not include intake and output manifolds 102-108. For the embodiment shown in FIG. 2A, plate 44 includes two heat transfer appendages 46a and 46b that substantially span both sides of plate 44 that do not include a gas manifold.

Peripherally disposing heat transfer appendage 46 allows heat transfer between inner portions of plate 44 and the externally disposed appendage 46 via the plate substrate 89. Conductive thermal communication refers to heat transfer between bodies that are in contact or that are integrally formed. Thus, lateral conduction of heat between external portions of plate 44 (where the heat transfer appendage 46 attaches) and central portions of bi-polar plate 44 occurs via conductive thermal communication through substrate 89. In one embodiment, heat transfer appendage 46 is integral with substrate material 89 in plate 44. Integral in this sense refers to material continuity between appendage 46 and plate 44. An integrally formed appendage 46 may be formed with plate 44 in a single molding, stamping, machining or MEMs process of a single metal sheet, for example. Integrally forming appendage 46 and plate 44 permits conductive thermal communication and heat transfer between inner portions of plate 44 and the heat transfer appendage 46 via substrate 89. In another embodiment, appendage 46 comprises a material other than that used in substrate 89 that is attached onto plate 44 and conductive thermal communication and heat transfer occurs at the junction of attachment between the two attached materials.

Heat may travel to or form the heat transfer appendage 46. In other words, appendage 46 may be employed as a heat sink or source. Thus, heat transfer appendage 46 may be used as a heat sink to cool internal portions of bi-polar plate 44 or an MEA 62. Fuel cell 20 employs a cooling medium to remove heat from appendage 46. Alternatively, heat transfer appendage 46 may be employed as a heat source to provide heat to internal portions of bi-polar plate 44 or an MEA 62. In this case, a catalyst is disposed on appendage 46 to generate heat in response to the presence of a heating medium.

For cooling, heat transfer appendage 46 permits integral conductive heat transfer from inner portions of plate 44 to the externally disposed appendage 46. During hydrogen consumption and electrical energy production, the electrochemical reaction generates heat in each MEA 62. Since internal portions of bi-polar plate 44 are in contact with the MEA 62, a heat transfer appendage 46 on a bi-polar plate 44 thus cools an MEA 62 adjacent to the plate via a) conductive heat transfer from MEA 62 to bi-polar plate 44 and b) lateral thermal communication and conductive heat transfer from central portions of the bi-polar plate 44 in contact with the MEA 62 to the external portions of plate 44 that include appendage 46. In this case, heat transfer appendage 46 sinks heat from substrate 89 between a first channel field 72 on one face 75 of plate 44 and a second channel field 72 on the opposite face 75 of plate 44 to heat transfer appendage 46 in a direction parallel to a face 75 of plate 44. When a fuel cell stack 60 includes multiple MEA layers 62, lateral thermal communication through each bi-polar plate 44 in this manner provides interlayer cooling of multiple MEA layers 62 in stack 60—including those layers in central portions of stack 60.

Fuel cell 20 employs a cooling medium that passes over heat transfer appendage 46. The cooling medium receives and removes heat from appendage 46. Heat generated internal to stack 60 thus conducts through bi-polar plate 44, to appendage 46, and heats the cooling medium via convective heat transfer between the appendage 46 and cooling medium. Air is suitable for use as the cooling medium.

As shown in FIG. 3B, heat transfer appendage 46 may be configured with a thickness 194 that is less than the thickness 196 between opposite faces 75 of plate 44. In one embodiment, thickness 194 is less than about one half of thickness 196. In another embodiment, thickness 194 is about one-third the thickness 196. The reduced thickness of appendages 46 on adjacent bi-polar plates 44 in the fuel cell stack 60 forms a channel 190 (see FIG. 3A). Multiple adjacent bi-polar plates 44 and appendages 46 in stack form numerous channels 190. Each channel 190 permits a cooling medium to pass therethrough and across heat transfer appendages 46. In one embodiment, fuel cell stack 60 includes a mechanical housing 197 that encloses and protects stack 60 (see FIG. 5A). Walls 199 of housing 197 also provide additional ducting for the heating medium by forming ducts between adjacent appendages 46 and walls 197.

The cooling medium may be a gas or liquid. Heat transfer advantages gained by high conductance bi-polar plates 44 allow air to be used as a cooling medium to cool heat transfer appendages 46 and stack 60. For example, a dc-fan may be attached to an external surface of the mechanical housing. The fan moves air through a hole in the mechanical housing, through channels 190 to cool heat transfer appendages 46 and fuel cell stack 60, and out an exhaust hole or port in the mechanical housing. Fuel cell system 10 may then include active thermal controls. Increasing or decreasing coolant fan speed regulates the amount of heat removal from stack 60 and the operating temperature for stack 60. In one embodiment of an air-cooled stack 60, the coolant fan speed increases or decreases as a function of the actual cathode exit temperature, relative to a desired temperature set-point.

Thermal conduction through bi-polar plates 44 and high thermal conductivity in each bi-polar plate 44 provides improved thermal uniformity for stack 60. In one embodiment, each bi-polar plate includes a thermal conductance greater than 1 W/mK. High thermal conductivity in this range permits a maximum temperature gradient in each plate 44 less than 2° F., for example. Thermal conduction through bi-polar plates 44 thus increases the thermal stability of stack 60, which increases the performance and life of fuel cell 20. Heat transfer appendages 46 also permits a smaller stack 60 size relative to conventional methods of disposing intermittent heat removal layers between the bi-polar plates 44.

For heating, heat transfer appendage 46 allows integral heat transfer from the externally disposed appendage 46 to inner portions of plate 44. The electrochemical reaction responsible for hydrogen consumption and electrical energy generation typically requires an elevated temperature. Start temperatures greater then 150 degrees Celsius are common.

In one embodiment, fuel cell comprises a catalyst 192 disposed in contact with, or in proximity to, a heat transfer appendage 46. The catalyst 192 generates heat when a heating medium passes over it. The heating medium is any gas or fluid that reacts with catalyst 192 to generate heat. Typically, catalyst 192 and the heating medium employ an exothermic chemical reaction to generate the heat. Heat transfer appendage 46 and plate 44 then transfer heat into the fuel cell stack 60, e.g. to heat internal MEA layers 62. For example, catalyst 192 may comprise platinum and the heating medium includes the hydrocarbon fuel source 17 supplied to fuel processor 15 (FIG. 1A). In one embodiment, the fuel source 17 is heated before entering fuel cell 20 and enters fuel cell 20 as a gas. Similar to the cooling medium described above, a fan disposed on one of the walls 199 then moves the gaseous heating medium within housing 197. In a specific embodiment, the hydrocarbon fuel source 17 used to react with catalyst 192 comes from a reformer exhaust in fuel processor 15. This advantageously pre-heats the fuel source 17 before receipt within fuel cell 20 and also uses or burns any fuel remaining in the reformer exhaust after use by fuel processor 15. Alternatively, fuel cell 20 includes a separate hydrocarbon fuel source 17 feed that directly supplies hydrocarbon fuel source 17 to fuel cell 20 for heating and reaction with catalyst 192. Other suitable catalysts 192 include palladium, a platinum/palladium mix, iron, ruthenium, and combinations thereof. Each of these will react with a hydrocarbon fuel source 17 to generate heat. Other suitable heating catalysts 192 include platinum on alumina and platinum/palladium on alumina, for example.

As shown in FIG. 2A, catalyst 192 is arranged on, and in contact with, each heat transfer appendage 46b. In this case, the heating medium passes over each appendage 46 and reacts with catalyst 192. This generates heat, which is absorbed via conductive thermal communication by the cooler appendage 46. Wash coating may be employed to dispose catalyst 192 on each appendage 46. A ceramic support may also be used to bond catalyst 192 on an appendage 46.

Figure 5A:
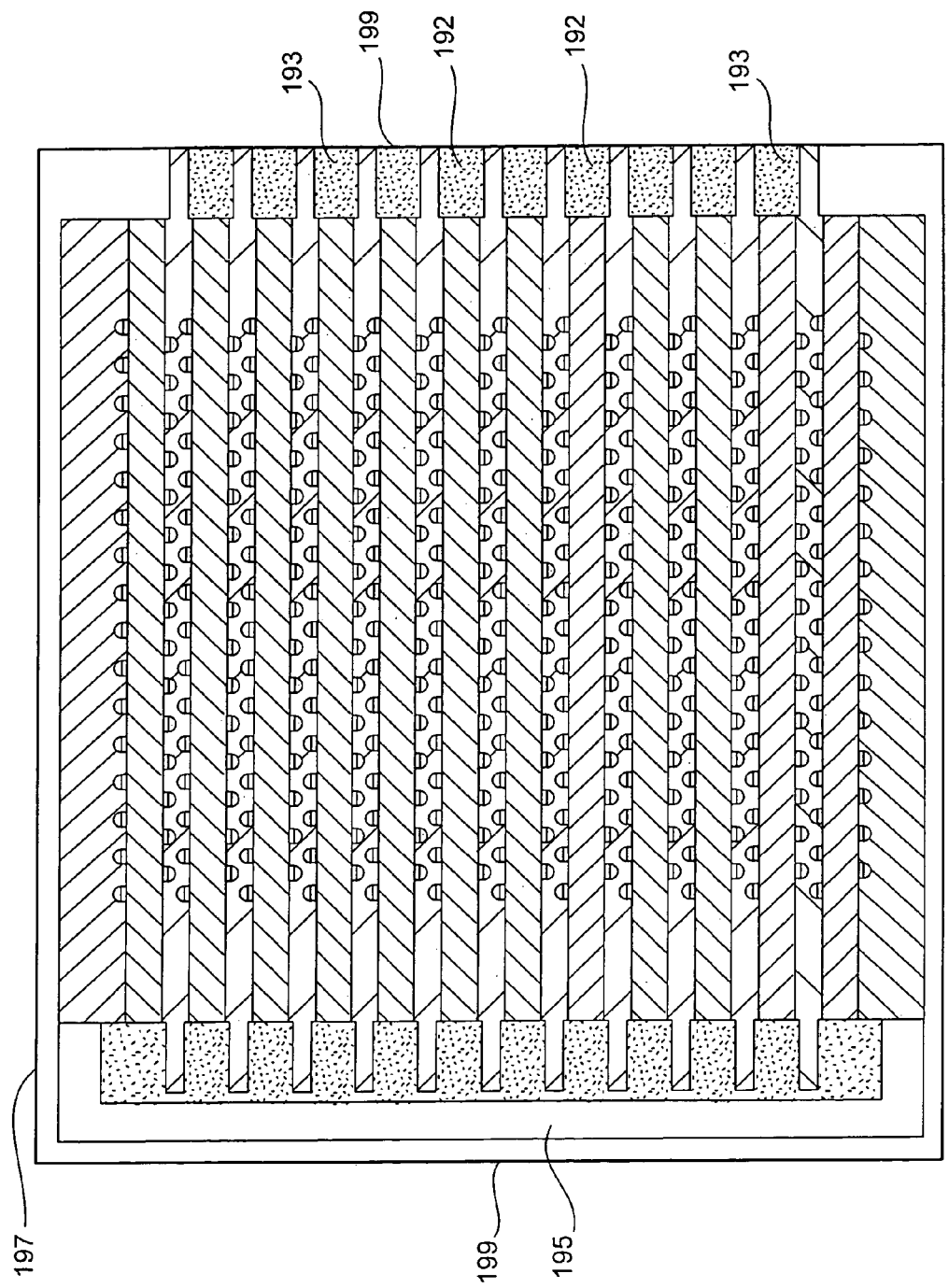
FIG. 5A illustrates a cross sectional view of a fuel cell stack for use in the fuel cell of FIG. 1A in accordance with another embodiment of the present invention.
Figure 5B:
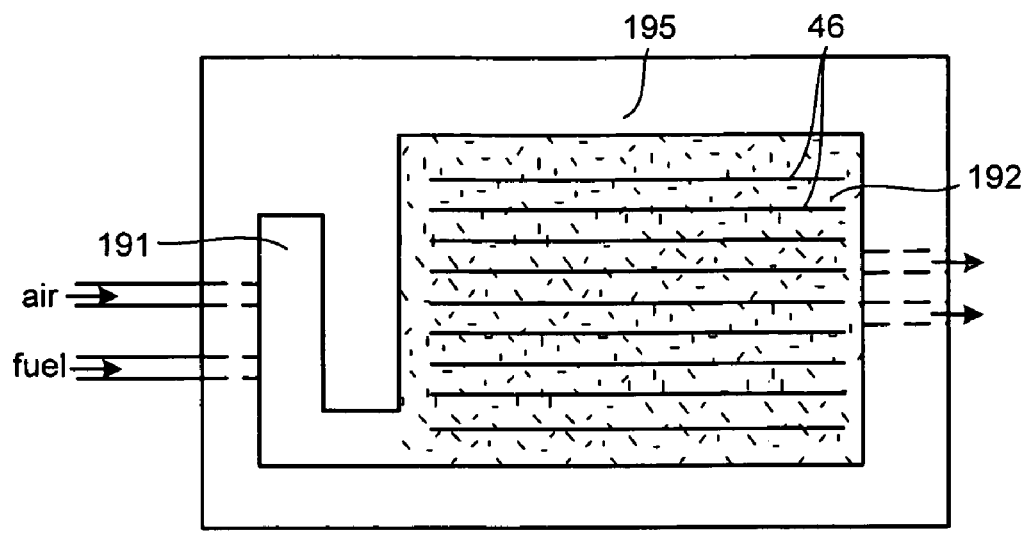
FIG. 5B illustrates a side view of gaseous travel through the bulkhead shown in FIG. 5A.

FIG. 5A illustrates two examples in which a thermal catalyst 192 is disposed in proximity to heat transfer appendage 46. Proximity in this case refers to being arranged relative to heat transfer appendage 46 such that heat generated by catalyst 192 transfers to appendage 46, either by conduction, convection and/or radiation. As shown in FIG. 5A, fuel cell 20 comprises a bulkhead 195 that contains catalyst 192. Bulkhead 195 attaches to end plates 64 (e.g., via an adhesive tape such as kapton) and creates a void for containing catalyst 192 and each appendage 46. Catalyst pellets 192 are then disposed in bulkhead 195. The bulkhead 195 allows the heating medium to pass over and interact with catalyst 192. FIG. 5B illustrates a side view of gaseous travel through bulkhead 195. Air and fuel enter a mixing chamber 191 before travel of the mixed gases across the heat transfer appendages 46. One or more outlet ports then exhaust the gases after interaction with catalyst 192.

As shown in FIG. 2A, the fuel cell 20 includes a mechanical housing 197 that encloses and protects stack 60. Walls 199 of housing 197 and appendages 46 combine to form ducting 193. The inter-appendage ducting 193 permits a) catalyst 192 to be packed into the ducting 193 and b) permits the heating medium to pass through ducting 193 and over catalyst 192. In this case, catalyst 192 is packed in ducting 193 with a packing density loose enough to permit a gas to pass therethrough without encountering excessive resistance. A fan is then used to provide the heating medium into ducting 193.

For catalyst-based heating, heat then a) transfers from catalyst 192 to appendage 46, b) moves laterally though bi-polar plate 44 via conductive heat transfer from lateral portions of the plate that include heat transfer appendage 46 to central portions of bi-polar plate 44 in contact with the MEA layers 62, and c) conducts from bi-polar plate 44 to MEA layer 62. When a fuel cell stack 60 includes multiple MEA layers 62, lateral heating through each bi-polar plate 44 provides interlayer heating of multiple MEA layers 62 in stack 60, which expedites fuel cell 20 warm up.

Bi-polar plates 44 of FIG. 2A include heat transfer appendages 46 on each side. In this case, one set of heat transfer appendages 46a is used for cooling while the other set of heat transfer appendages 46b is used for heating. Although heat transfer appendages 46 of FIG. 5A are illustrated with two different types of heating via catalyst 192 (namely, by packing into ducting 193 and storage in bulkheads 195), it is understood that fuel cell 20 need not include multiple methods of heating appendages 46 and may only include one the aforementioned techniques. In addition, while bi-polar plates 44 illustrated in FIGS. 2A and 3A show plates 44 with only one or two heat transfer appendages 46 disposed on sides of stack 60, appendage 46 arrangements can be varied to affect and improve heat dissipation and thermal management of fuel cell stack 60 according to other specific designs. For example, more than two heat transfer appendages 46 may be employed on a single plate 44 to increase heat transfer between internal and external portions of plate 44. In addition, appendages 46 need not span a side of plate 44 as shown and may be tailored based on how the heating fluid is channeled through the housing 197.

7. Improved Interplate Sealing

The present invention also improves sealing of adjacent bi-polar plates 44. As mentioned above with respect to FIG. 2E, plate 44 includes sealing portion 87 that borders channel field 72 about the periphery of each plate 44. The sealing portion 87 surrounds channel fields 72 and surrounds manifolds 102-108 about the periphery of plate 44. The sealing portion 87 seals the MEA layer 62 and manifolds 102-108.

Sealing works well when mating faces to be sealed are substantially flat and devoid of structures that diverge from a flat or mating fit. For the bi-polar plate 44 of FIG. 2E, manifold channels 76e that extend from manifold 102 to buffer 150a prevent a continuous portion of face 75a from sealing about manifold 102 and sealing about channel field 72.

Figure 7A:
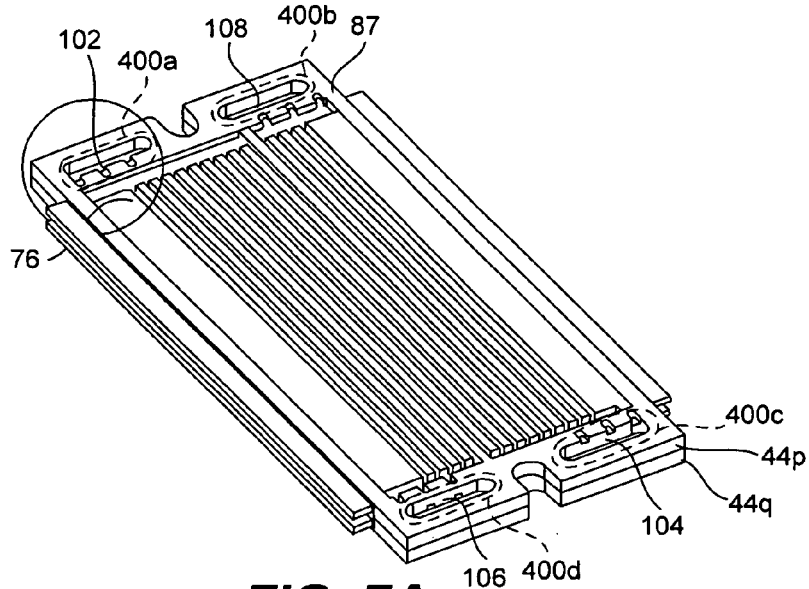
FIG. 7A illustrates a top perspective view of bi-polar plates including gasket landings in accordance with one embodiment of the present invention.
Figure 7B:
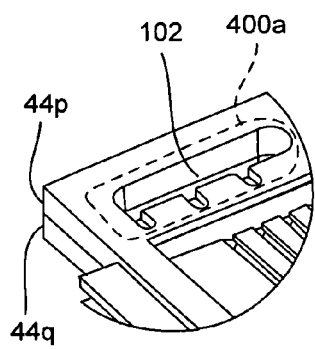
FIG. 7B shows a close-up of a landing on the top plate of FIG. 7A.

FIG. 7A illustrates a top perspective view of bi-polar plates 44 including gasket landings 400 on sealing portions 87 of the plate in accordance with one embodiment of the present invention. FIG. 7B shows a close-up of landing 400a. Gasket landings 400a-d are each disposed on the top face 75a of plate 44p and peripherally surround a manifold on face 75a. Similar landings are also found on the bottom face of plate 44. As the term is used herein, a gasket landing 400 refers to a portion of a bi-polar plate face 75 having a continuous planar path on the face 75. Typically, the gasket landing 400 path surrounds a manifold about the entire border of the manifold, thus allowing a full perimetric seal. For example, gasket landing 400a fully surrounds the planar perimeter of hydrogen inlet manifold 102 on face 75a of plate 44p, gasket landing 400b peripherally surrounds cathode exhaust manifold 108 on face 75a of plate 44p, gasket landing 400c peripherally surrounds anode exhaust manifold 104, and gasket landing 400d peripherally surrounds inlet oxygen manifold 106.

Figure 7C:
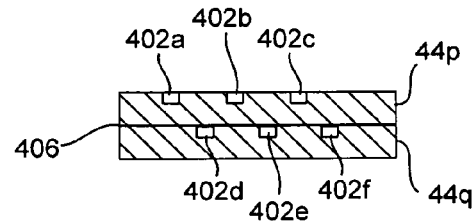
FIG. 7C illustrates a front cross section of bi-polar plates of FIG. 7A and shows the staggering of manifold channels on each plate.

When bi-polar plates 44p and 44q are stacked adjacent to each other, each landing 400 provides continuous and uninterrupted planar contact between opposing faces of plates 44p and 44q. As shown in FIG. 7C, a gasket 406 is disposed between landings 400 of adjacent plates 44p and 44q. Pressure from bolts 82 and end plates 64 (FIG. 2A) then compresses gasket 406 between plates 44 and between the continuous landings 400. Gasket 406 may include materials selected from the following high temperature and chemical resistant materials: silicone, poly (tetrafluro ethylene) (Teflon PTFE), poly (perfluoroalkoxy) (Teflon PFA), fluorinated ethylene propylene (FEP), polyvinylidene fluride (PVDF), polysiloxane (silicone rubber/sealant), polyimide (Kapton), polyamide (nylon), polyester (Mylar), Epoxy, polyphenylene oxide (PPO), sulfonated polyphenylene oxide, polystyrene oxide, polymethacrylate, polyether ether ketone (PEEK), and copolymer and mixture thereof. Gasket 406 may be screen printed to fit the non-symmetrical dimensions of landing 400. The gasket materials may also be applied by die cutting gasket films, direct screen printing, spraying, casting or overmolding of high performance gasket solutions.

As mentioned above, substrate 89 may also be raised at sealing portion 87 relative to substrate 89 in the central portion of plate 44 and no gasket is employed between the plates 44. In this case, landings 400 of adjacent plates 44 act as the seal when pressed together by bolts 82 and end plates 64 and no gasket is needed.

Figure 7D:
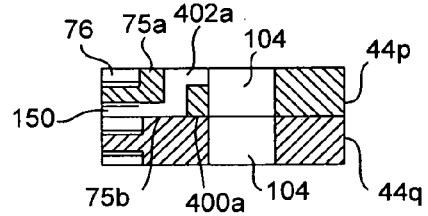
FIG. 7D illustrates a side cross section of bi-polar plates of FIG. 7A taken through a manifold channel of the top plate.
Figure 7E:
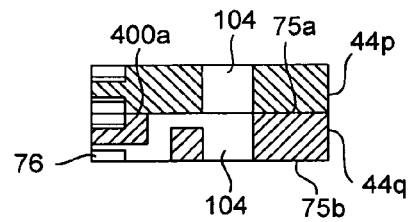
FIG. 7E illustrates a side cross section of bi-polar plates of FIG. 7A taken through a manifold channel of the bottom plate.

To create landings 400, each plate 44 includes manifold channels 402 that a) open to a manifold, b) traverse the bi-polar plate 44 substrate from the top face 75a to the bottom face 75b, and c) are configured to communicate gas between a manifold and a channel field. FIG. 7D illustrates a side cross section of bi-polar plates 44p and 44q taken through manifold channel 402a of plate 44p. FIG. 7E illustrates a side cross section of bi-polar plates 44p and 44q taken through manifold channel 402d of plate 44q. As shown, manifold channel 402a opens into manifold 104 at the top face 75a, turns 90 degrees down and extends from the top face 75a to the bottom face 75b, and progresses along the bottom face to open to a flow buffer 150 or channel of a channel field on the bottom face 75b. Similarly, manifold channel 402d opens into manifold 104 at the top face 75a for plate 44q, turns 90 degrees down and extends from the top face 75a to the bottom face 75b, and progresses along the bottom face 75b of plate 44q to open to a channel 76 of a channel field on the bottom face 75b. Thus, each manifold channel 402 starts gaseous communication on one face and routes the gas to a second face of plate 44. While the manifolds 402 shown in FIGS. 7E and 7F include orthogonal dimensions between faces 75, other arrangements are anticipated such as rounded corners or non-ninety degree turns.

By routing channel 402 through the plate, planar space is created between a manifold and channel field on both faces 75 of plate 44. The planar space permits continuous surface for landings 400 about each manifold. Gasket landing 400 thus avoids intersection with the manifold channel 402 on each face 75. Conversely, manifold channel 402 avoids intersection with gaskets landing 400 on both faces of the plate 44 on which it is formed.

As shown, each manifold communicates gases to three manifold channels 402. Channels 402 are laterally staggered between adjacent plates 44p and 44q to prevent channels 402 on adjacent plates from overlapping when plates 44p and 44q are arranged adjacent to each other in the stack 60. FIG. 7C illustrates a front cross section of bi-polar plates 44p and 44q and shows the staggering of manifold channels 402a-f on plates 44p and 44q about manifold 104.

8. Pre-Bent End Plates

Figure 6:
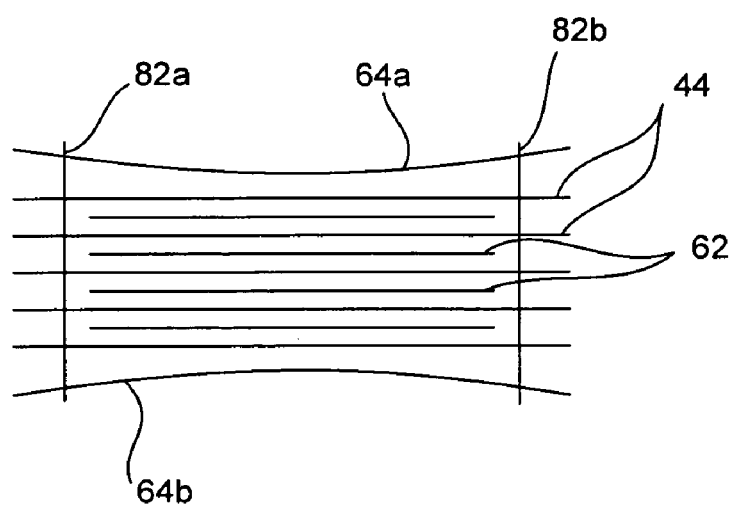
FIG. 6 illustrates pre-bent end plates suitable for use in the fuel cell of FIG. 1A in accordance with one embodiment of the present invention.

Referring back to FIG. 2A, MEA layers 62 require pressure for operation. Stack 60 achieves this pressure by compressing top and bottom end plates 64a and 64b via bolts 82a and 82b. Tightening bolts 82a and 82b increases the pressure provided by end plates 64 on the planar area of each MEA layer 62. Bolts 82 thus hold stack 60 under compression via end plates 64. Using flat end plates 64 often results in unequal pressure distribution to each MEA layer 62 in fuel cell stack 60. More specifically, pressure in stack 60 about or near where bolts 82 apply local pressure is often greater than in central planar portions of the stack. This pressure variance affects performance of fuel cell 20. To reduce pressure variance in stack 60, FIG. 6 illustrates pre-bent end plates 64a and 64b suitable for use in fuel cell 20 in accordance with one embodiment of the present invention.

One of the top and bottom end plates 64a and 64b is configured with a shape before assembly in fuel cell 20 that increases pressure applied to a central planar portion of MEA 62 when the top end plate 64a and bottom end plate 64b are secured together. 'Pre-bent' end plates, as the term is used herein, refers to end plates 64 that are configured with a shape before assembly that substantially flattens when top end plate 64a and bottom end plate 64b are secured together in fuel cell stack 60. The pre-bent end plates 64 are configured and curved before assembly in fuel cell stack 60 such that assembly in stack 60 causes pressure applied by assembly of end plates 64 to increase in a central planar region of stack 60 between bolts 82 relative to planar portions of MEA 62 closer to bolts 82. This reduces planar pressure variance throughout an MEA 62 in the stack 60.

As shown, pre-bent end plates 64a and 64b include a convex curvature before assembly that reduces when the top end plate and bottom end plate 64 are secured together. For the one-dimensional convex curve shown in FIG. 6, bolts 82 pass through holes in an opposite sides of each plate 64. The curvature converts local pressure in each end of pre-bent end plates 64 via tightening of bolts 82 to central planar pressure. Initially, the shape of pre-bent end plates 64 causes increased pressure in the central planar portions of each MEA 62 in the stack 60. As bolts 82 tighten, the convex curvature of plates 64 reduces. In addition, the convex curvature converts proportionately less local forces from each bolt 82 to central planar compression of membrane electrode assembly layers 62. When fully bolts 82 are fully tightened, pressure in the central planar portions of each MEA 62 balances the pressure in portions of each MEA 62 proximate to the planar position of bolts 82. This reduces planar pressure variance in MEA layers 62 and stack 60.

Assembling pre-bent end plates 64 in fuel cell stack 60 results in a stack 60 such as that shown in FIG. 2A, with the exception of reduced planar pressure variance in MEA layers 62. Pre-bent end plates 64 thus hold the bi-polar plates 44 and MEA layers 62 together, and apply pressure across the planar area of each bi-polar plate 44 and each MEA 62 with a reduced pressure variance.

One or both end plates 64a and 64b can be pre-bent or otherwise configured before assembly. For curved plates, the amount of curvature in each end plate 64 is configured to minimize the planar pressure variance in MEA layers 62 of fuel cell stack 60. The thickness of end plate 64, end plate 64 material, and the desired pressure to be applied onto stack 60 affect the amount of curvature in each end plate 64. In one embodiment, end plate has a thickness from to about ½ mm to about 3 mm. End plates 64 may comprise a suitably rigid material such as stainless steel, titanium, aluminum, a composite, or ceramic, for example. In one embodiment, each MEA 62 employs an operating pressure from about 30 psi to about 400 psi. An operating pressure of about 100 psi is also suitable for some stack 60 designs.

9. CONCLUSION

While this invention has been described in terms of several preferred embodiments, there are alterations, permutations, and equivalents that fall within the scope of this invention which have been omitted for brevity's sake. For example, although the present invention has been described in terms of pre-bent end plates 64, not all embodiments of the present invention need include pre-bent end plates 64 and may employ traditional flat end plates. In addition, although the present invention has been described in terms of one or more flow buffers used to equalize gaseous distribution, bi-polar plates 44 including heat transfer appendages need not include flow buffers. It is therefore intended that the scope of the invention should be determined with reference to the appended claims.

What is claimed is:

1. A fuel cell for producing electrical energy, the fuel cell comprising:
   a fuel cell stack including
   a) a set of single plate solid metal substrate bi-polar plates, each bi-polar plate in the fuel cell stack comprising
      i) a first channel field disposed on a first face of the bi-polar plate and including a set of channels configured to distribute hydrogen,
      ii) a second channel field disposed on a second face of the bi-polar plate and including a second set of channels configured to distribute oxygen, wherein a channel included in the first channel field has an overlapping channel depth that extends past a channel depth for a channel included in the second channel field,
      iii) a first manifold that extends through the bi-polar plate from the first face to the second face and configured to deliver a gas to the first channel field or receive a gas from the first channel field;
      iv) a first flow buffer formed as a trough into the first face of the bi-polar plate and configured to receive a first gaseous flow from a first channel in the first set of channels and a second gaseous flow from a second channel in the first set of channels and to output the first and second gaseous flows in the first set of channels to a third channel in the first set of channels, wherein the flow buffer is configured to reduce a pressure difference between the first and second gaseous flows in the first set of channels before outputting the first and second gaseous flows to the third channel in the first set of channels;
      v) a second flow buffer formed as a trough into the second face of the bi-polar plate, positioned at least partially opposite to the first flow buffer formed into the first face of the bi-polar plate, and configured to receive a first gaseous flow from a first channel in the second set of channels and a second gaseous flow from a second channel in the second set of channels and to output the first and second gaseous flows in the second set of channels to a third channel in the second set of channels, wherein the second flow buffer is configured to reduce a pressure difference between the first and second gaseous flows in the second set of channels before outputting the first and second gaseous flows to the third channel in the second set of channels, and
   b) a membrane electrode assembly disposed between two bi-polar plates, the membrane electrode assembly including a hydrogen catalyst, an oxygen catalyst and an ion conductive membrane that electrically isolates the hydrogen catalyst from the oxygen catalyst.

2. The fuel cell of claim 1 further comprising a heat transfer appendage arranged outside the first channel field and in conductive thermal communication with the solid metal substrate bi-polar plate wherein the heat transfer appendage is configured to sink heat from the substrate between the first channel field and the second channel field to the heat transfer appendage in a direction parallel to the first face.

3. The fuel cell of claim 2 wherein the heat transfer appendage has a smaller thickness than a thickness for the substrate between the first face and the second face.

4. The fuel cell of claim 2 wherein adjacent bi-polar plates in the fuel cell stack are arranged such that heat transfer appendages on the adjacent bi-polar plates form a channel for a heat or cooling media to pass through.

5. The fuel cell of claim 2 wherein the heat transfer appendage comprises a material common to the substrate.

6. The fuel cell of claim 4 wherein the heat transfer appendage is integral with the substrate.

7. The fuel cell of claim 2 wherein the heat transfer appendage is arranged on a side or edge of the bi-polar plate.

8. The fuel cell of claim 2 wherein the heat transfer appendage substantially spans a side of the bi-polar plate that does not include an intake or output manifold.

9. The fuel cell of claim 1 wherein the substrate comprises a thermal conductance greater than 1W/mK.

10. The fuel cell of claim 1 wherein a bi-polar plate in the stack comprises a coating that increases electrical conductance of the bi-polar plate.

11. The fuel cell of claim 10 wherein the substrate is coated with an electrically conductive metal alloy, ceramic alloy or polymeric material.

12. The fuel cell of claim 10 wherein a bi-polar plate comprises a planar electrical resistance less than about 100 mOhm $cm^2$.

13. The fuel cell of claim 1 wherein the first channel field is configured to distribute hydrogen to a gas distribution layer included in a membrane electrode assembly that includes the hydrogen catalyst.

14. The fuel cell of claim 13 wherein the second channel field is configured to distribute oxygen to a gas distribution layer included in the membrane electrode assembly that includes the oxygen catalyst.

15. The fuel cell of claim 14 wherein the second channel field is configured to distribute oxygen in a direction that counters a direction of hydrogen distribution by the first channel field.

16. The fuel cell of claim 15 wherein the second channel field is configured to distribute oxygen in parallel to the gas distribution layer that includes the oxygen catalyst.

17. The fuel cell of claim 1 wherein the fuel cell is configured to generate less than about 200 watts.

18. The fuel cell of claim 1 wherein a first bi-polar plate and a second bi-polar plate in the set of bi-polar plates each include a different manifold arrangement.

19. A fuel cell for producing electrical energy, the fuel cell comprising:
   a fuel cell stack including
   a) a set of single plate solid metal substrate bi-polar plates, each bi-polar plate comprising:
      i) a first channel field disposed on a first face of the substrate and a second channel field disposed on a second face of the substrate, the first channel field including a set of channels configured to distribute fuel and the second channel field including a second set of channels configured to distribute oxidant,
      ii) a first manifold that extends through the bi-polar plate from the first face to the second face and configured to deliver a gas to the first channel field or receive a gas from the first channel field;
      iii) a first manifold channel that opens to the first manifold on the second face, the first manifold channel traversing the substrate from the first face to the second face, and configured to communicate gas between the first manifold on the second face and the first channel field on the first face, wherein the first manifold channel of a first bi-polar plate is offset laterally from the first manifold channel of a second adjacent bi-polar plate such that the first manifold channels of the first and second bi-polar plates do not substantially align;

iv) a first flow buffer formed as a trough into the substrate on the first face and configured to receive a first gaseous flow from a first channel in the first set of channels and a second gaseous flow from a second channel in the first set of channels and to output the first and second gaseous flows in the first set of channels to a third channel in the first set of channels, wherein the flow buffer is configured to reduce a pressure difference between the first and second gaseous flows in the first set of channels before outputting the first and second gaseous flows to the third channel in the first set of channels;

v) a second flow buffer formed as a trough into the substrate on the second face and configured to receive a first gaseous flow from a first channel in the second set of channels and a second gaseous flow from a second channel in the second set of channels and to output the first and second gaseous flows in the second set of channels to a third channel in the second set of channels, wherein the second flow buffer is configured to reduce a pressure difference between the first and second gaseous flows in the second set of channels before outputting the first and second gaseous flows to the third channel in the second set of channels, and vi) a non-porous heat transfer appendage in conductive thermal communication with the substrate and arranged outside the first and second channel fields and b) a membrane electrode assembly disposed between two bi-polar plates, the membrane electrode assembly including an anode catalyst, a cathode catalyst and an ion conductive membrane that electrically isolates the anode catalyst from the cathode catalyst.

20. The fuel cell of claim 19 wherein the heat transfer appendage is configured to sink heat from the substrate between the first channel field and the second channel field to the heat transfer appendage in a direction parallel to the first face.

21. The fuel cell of claim 19 wherein the heat transfer appendage has a smaller thickness than a thickness for the substrate between the first face and the second face.

22. The fuel cell of claim 19 wherein adjacent bi-polar plates in the fuel cell stack are arranged such that heat transfer appendages on the adjacent bi-polar plates form a channel for a heat or cooling medium to pass through.

23. The fuel cell of claim 19 wherein the heat transfer appendage is integral with the substrate.

24. The fuel cell of claim 19 wherein the heat transfer appendage is ananged on a side or edge of the plate.

25. The fuel cell of claim 19 wherein the heat transfer appendage substantially spans a side of the bi-polar plate that does not include an intake or output manifold.

26. The fuel cell of claim 19 wherein the substrate comprises a thermal conductance greater than 1W/mK.

27. The fuel cell of claim 19 wherein the fuel cell includes more than ten membrane electrode assembly layers and has an overall package thickness less than one centimeter.

28. The fuel cell of claim 19 wherein the first bi-polar plate and the second bi-polar plate each include a different manifold arrangement.

29. The fuel cell of claim 19 further comprising:
a thermal catalyst disposed in contact with or in proximity to the non-porous heat transfer appendage and that generates heat with exposure to a heating medium.

30. The fuel cell of claim 29 wherein the thermal catalyst is disposed on the one or more heat transfer appendages of the bi-polar plates.

31. The fuel cell of claim 29 wherein the heat transfer appendage has a smaller thickness than a thickness of the substrate between the first face and the second face.

32. The fuel cell of claim 29 wherein the thermal catalyst is packed in the vicinity of the heat transfer appendage.

33. The fuel cell of claim 29 wherein the heating medium comprises a hydrocarbon fuel source provided to a fuel processor that separates hydrogen from the hydrocarbon fuel source and provides the hydrogen to the fuel cell.

34. The fuel cell of claim 33 wherein the hydrocarbon fuel source is routed from an exhaust of a fuel processor.

35. The fuel cell of claim 29 wherein the thermal catalyst comprises platinum.

36. The fuel cell of claim 29 wherein the heat transfer appendage is configured to sink heat from substrate between the first channel field and the second channel field to the heat transfer appendage in a direction parallel to the first face.

37. The fuel cell of claim 19 wherein the fuel cell is a direct methanol fuel cell and the fuel comprises liquid methanol.

38. The fuel cell of claim 29 further comprising:
a second manifold that extends through the bi-polar plate from the first face to the second face and configured to deliver a gas to the second channel field or receive a gas from the second channel field;
a second manifold channel that opens to the second manifold on the first face, traverses the bi-polar plate from the second face to the first face, and is configured to communicate gas between the second manifold on the first face and the second channel field on the second face;
a first sealing area on the first face that peripherally surrounds each of the first channel field, the first manifold and the second manifold on the first face, thereby isolating them from each other, whereby the first sealing area extends between and isolates a portion of the second manifold channel on the first face from the first channel field, and the first sealing area further extends between and isolates a portion of the first manifold channel on the first face from the first manifold; and
a second sealing area on the second face that peripherally surrounds each of the second channel field, the first manifold and the second manifold on the second face, thereby isolating them from each other, whereby the second sealing area extends between and isolates a portion of the first manifold channel on the second face from the second channel field, and the second sealing area further extends between and isolates a portion of the second manifold channel on the second face from the second manifold;
wherein the non-porous heat transfer appendage is arranged laterally external to the first and second sealing areas.

* * * * *

UNITED STATES PATENT AND TRADEMARK OFFICE
CERTIFICATE OF CORRECTION

| | |
|---|---|
| PATENT NO. | : 7,655,337 B2 |
| APPLICATION NO. | : 10/877770 |
| DATED | : February 2, 2010 |
| INVENTOR(S) | : Ian W. Kaye |

Page 1 of 1

It is certified that error appears in the above-identified patent and that said Letters Patent is hereby corrected as shown below:

Col. 21, line 3,     change "polyanilne" to --polyaniline--.

Col. 28, line 65,    change "tetrafluro" to --tetrafluoro--.

Col. 28, line 67,    change "fluride" to --fluoride--.

Col. 33, line 60 (Claim 24), change "annaged" to --arranged--.

Signed and Sealed this

Fifteenth Day of June, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,655,337 B2 | Page 1 of 1 |
| APPLICATION NO. | : 10/877770 | |
| DATED | : February 2, 2010 | |
| INVENTOR(S) | : Ian W. Kaye | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1607 days.

Signed and Sealed this

Twenty-third Day of November, 2010

David J. Kappos
*Director of the United States Patent and Trademark Office*